(12) United States Patent
Lander et al.

(10) Patent No.: US 10,948,132 B2
(45) Date of Patent: Mar. 16, 2021

(54) INTEGRITY ASSESSMENT OF A PIPELINE NETWORK

(71) Applicant: 64Seconds, Inc., Framingham, MA (US)

(72) Inventors: Paul Lander, Framingham, MA (US); Craig Goldman, Westborough, MA (US)

(73) Assignee: 64seconds, Inc., Framingham, MA (US)

( * ) Notice: Subject to any disclaimer, the term of this patent is extended or adjusted under 35 U.S.C. 154(b) by 0 days.

(21) Appl. No.: 15/974,462

(22) Filed: May 8, 2018

(65) Prior Publication Data

US 2018/0320828 A1    Nov. 8, 2018

Related U.S. Application Data

(60) Provisional application No. 62/503,105, filed on May 8, 2017.

(51) Int. Cl.
*F17D 5/06*    (2006.01)
*G06F 1/14*    (2006.01)
(Continued)

(52) U.S. Cl.
CPC ............... *F17D 5/06* (2013.01); *G06F 1/14* (2013.01); *H04W 56/0015* (2013.01); *A62C 35/68* (2013.01); *A62C 37/50* (2013.01)

(58) Field of Classification Search
CPC ........ F17D 5/06; H04W 56/0015; G06F 1/14; A62C 37/50; A62C 35/68; H04Q 9/00;
(Continued)

(56) References Cited

U.S. PATENT DOCUMENTS 3,173,003 A    3/1965 Muller-Girard
3,223,194 A    12/1965 Michael
(Continued)

FOREIGN PATENT DOCUMENTS

DE    3726585 C2    2/1989
EP    0 955 531    11/1999
WO    2006/041981    4/2006

OTHER PUBLICATIONS

H. Schwarze; "Computer supported measuring system for automatic control of pipe networks and leak detection"; Technisches Messen 55(7-8); pp. 279-285; 1988 (Partial Translation included in text).
(Continued)

*Primary Examiner* — An T Nguyen
(74) *Attorney, Agent, or Firm* — Fish & Richardson P.C.

(57) ABSTRACT

Assessing pipeline integrity includes deploying vibration sensors at optimal sensing locations in the pipeline network. The sensors communicate with an analyzer via an intermediary that is a local or a remote wireless controller. A sensor records and processes vibration signals regularly, according to protocols kept in the memory of the sensor. The sensor, via a controller, communicates recorded data or processed data to an analyzer and receives updated protocols or other instructions from an analyzer. The analyzer aggregates recorded and processed data from the sensors, which are then analyzed to detect or localize leak sounds from the pipeline network. The recorded data from two or more sensors may be time-aligned using synchronization methods.

24 Claims, 10 Drawing Sheets

(51) Int. Cl.
*H04W 56/00* (2009.01)
*A62C 35/68* (2006.01)
*A62C 37/50* (2006.01)

(58) Field of Classification Search
CPC ..... E21B 47/122; E21B 47/182; H04L 7/041; H04L 7/0041
See application file for complete search history.

(56) References Cited

U.S. PATENT DOCUMENTS

| | | |
|---|---|---|
| 3,351,910 A | 11/1967 | Miller et al. |
| 3,413,653 A | 11/1968 | Wood |
| 3,478,576 A | 11/1969 | Bogle |
| 3,534,337 A | 10/1970 | Martin et al. |
| 3,697,970 A | 10/1972 | Jaxheimer |
| 4,019,373 A | 4/1977 | Freeman et al. |
| 4,083,229 A | 4/1978 | Anway |
| 4,172,379 A | 10/1979 | van Tilburg et al. |
| 4,237,454 A | 12/1980 | Meyer |
| 4,289,019 A | 9/1981 | Claytor |
| 4,306,446 A | 12/1981 | Fukuda |
| 4,327,576 A | 5/1982 | Dickey et al. |
| 4,495,805 A | 1/1985 | Dowling et al. |
| 4,524,526 A | 6/1985 | Levine |
| 4,543,817 A | 10/1985 | Sugiyama |
| 4,609,994 A | 9/1986 | Bassim et al. |
| 4,640,121 A | 2/1987 | Leuker et al. |
| 4,779,458 A | 10/1988 | Mawardi |
| 4,785,175 A | 11/1988 | Wormald et al. |
| 4,799,391 A | 1/1989 | Lara |
| 4,844,396 A | 7/1989 | Norton |
| 4,848,168 A | 7/1989 | Negishi |
| 4,858,462 A | 8/1989 | Coulter et al. |
| 4,958,296 A | 9/1990 | Saitoh et al. |
| 4,977,529 A | 12/1990 | Gregg et al. |
| 5,010,553 A | 4/1991 | Scheller et al. |
| 5,038,614 A | 8/1991 | Bseisu et al. |
| RE33,722 E | 10/1991 | Scifres et al. |
| 5,058,419 A | 10/1991 | Nordstrom et al. |
| 5,099,437 A | 3/1992 | Weber |
| 5,117,676 A | 6/1992 | Chang |
| 5,179,862 A | 1/1993 | Lynnworth |
| 5,205,173 A | 4/1993 | Allen |
| 5,225,996 A | 7/1993 | Weber |
| 5,272,646 A | 12/1993 | Farmer |
| 5,333,501 A | 8/1994 | Okada et al. |
| 5,343,737 A | 9/1994 | Baumoel |
| 5,349,568 A | 9/1994 | Kupperman et al. |
| 5,361,636 A | 11/1994 | Farstad et al. |
| 5,385,049 A | 1/1995 | Hunt et al. |
| 5,416,724 A | 5/1995 | Savic |
| 5,428,989 A | 7/1995 | Jerde et al. |
| 5,531,099 A | 7/1996 | Russo |
| 5,541,575 A | 7/1996 | Virnich |
| 5,544,074 A | 8/1996 | Suzuki et al. |
| 5,548,530 A | 8/1996 | Baumoel |
| 5,578,834 A | 11/1996 | Trobridge |
| 5,619,192 A | 4/1997 | Ayala |
| 5,675,506 A | 10/1997 | Savic |
| 5,708,195 A | 1/1998 | Kurisu et al. |
| 5,854,994 A | 12/1998 | Canada et al. |
| 5,922,942 A | 7/1999 | Roy |
| 5,960,807 A | 10/1999 | Reyman |
| 5,974,862 A | 11/1999 | Lander et al. |
| 5,992,246 A | 11/1999 | Nice |
| 6,082,193 A | 7/2000 | Paulson |
| 6,170,344 B1 | 1/2001 | Ignagni |
| 6,189,384 B1 | 2/2001 | Piety et al. |
| 6,424,270 B1 | 7/2002 | Ali |
| 6,443,228 B1 | 9/2002 | Aronstam et al. |
| 6,453,247 B1 | 9/2002 | Hunaidi |
| 6,530,263 B1 | 3/2003 | Chan |
| 6,553,322 B1 | 4/2003 | Ignagni |
| 6,553,336 B1 | 4/2003 | Johnson et al. |
| 6,567,006 B1 | 5/2003 | Lander et al. |
| 6,611,769 B2 | 8/2003 | Olson |
| 6,657,552 B2 | 12/2003 | Belski et al. |
| 6,691,724 B2 | 2/2004 | Ford |
| 6,694,285 B1 | 2/2004 | Choe et al. |
| 6,769,321 B1 | 8/2004 | Appleton et al. |
| 6,820,016 B2 | 11/2004 | Brown et al. |
| 6,935,425 B2 | 8/2005 | Aronstam |
| 6,957,157 B2 | 10/2005 | Lander |
| 7,007,545 B1 | 3/2006 | Martinek |
| 7,039,532 B2 | 5/2006 | Hunter |
| 7,231,482 B2 | 6/2007 | Leach |
| 7,239,250 B2 | 7/2007 | Brian et al. |
| 7,259,690 B1 | 8/2007 | Furmidge et al. |
| 7,263,450 B2 | 8/2007 | Hunter |
| 7,412,876 B2 | 8/2008 | Lawrence |
| 7,596,458 B2 | 9/2009 | Lander |
| 7,668,670 B2 | 2/2010 | Lander |
| 7,891,246 B2 | 2/2011 | Lander |
| 2002/0125413 A1* | 9/2002 | Saini ............... G01N 21/774 250/227.14 |
| 2002/0193144 A1 | 12/2002 | Belski et al. |
| 2003/0167847 A1 | 9/2003 | Brown et al. |
| 2003/0204338 A1 | 10/2003 | Martinek |
| 2005/0279169 A1* | 12/2005 | Lander ............... G01M 3/243 73/592 |
| 2007/0199383 A1 | 8/2007 | Lander et al. |
| 2008/0250869 A1* | 10/2008 | Breed ............... B60R 21/01552 73/861.27 |
| 2012/0298421 A1* | 11/2012 | Coates ............... E21B 47/101 175/50 |
| 2014/0343813 A1* | 11/2014 | Morselli ............... B60T 13/08 701/70 |
| 2015/0319675 A1* | 11/2015 | Park ............... H04W 56/001 370/338 |
| 2017/0268954 A1* | 9/2017 | Ocalan ............... G01M 3/243 |
| 2018/0239040 A1* | 8/2018 | Adams ............... G01V 1/22 |
| 2018/0320828 A1* | 11/2018 | Lander ............... G06F 1/14 |

OTHER PUBLICATIONS

RADCOM Technologies; SoundSensTM; Leak Noise Correlator; pp. 1-4.
MICROCORR Digital; Leak Detection—Digital Leak Noise Correlator; Palmer Environmental; MD Issue 1 Apr. 2001 UK; 8 pages.
Technical Specification WLM-Sensor; WLM-System pat. reg. "An integral and active Water Loss Management"; 1 page (date unknown).
WLM-Sensor; WLM-System-Description; 1 page (date unknown).

* cited by examiner

FIG. 7

| Operating State: | Sleeping | Recording | Local Radio | Network Radio | Total |
|---|---|---|---|---|---|
| Seconds per day | 86,400 | 60 | 50 | 10 | 86,400 |
| Power (mW) | 0.01 | 30 | 60 | 750 | |
| Daily energy (mW-s) | 864 | 1,800 | 3,000 | 7,500 | 13,164 |
| Energy percentage | 7% | 14% | 23% | 57% | 100% |

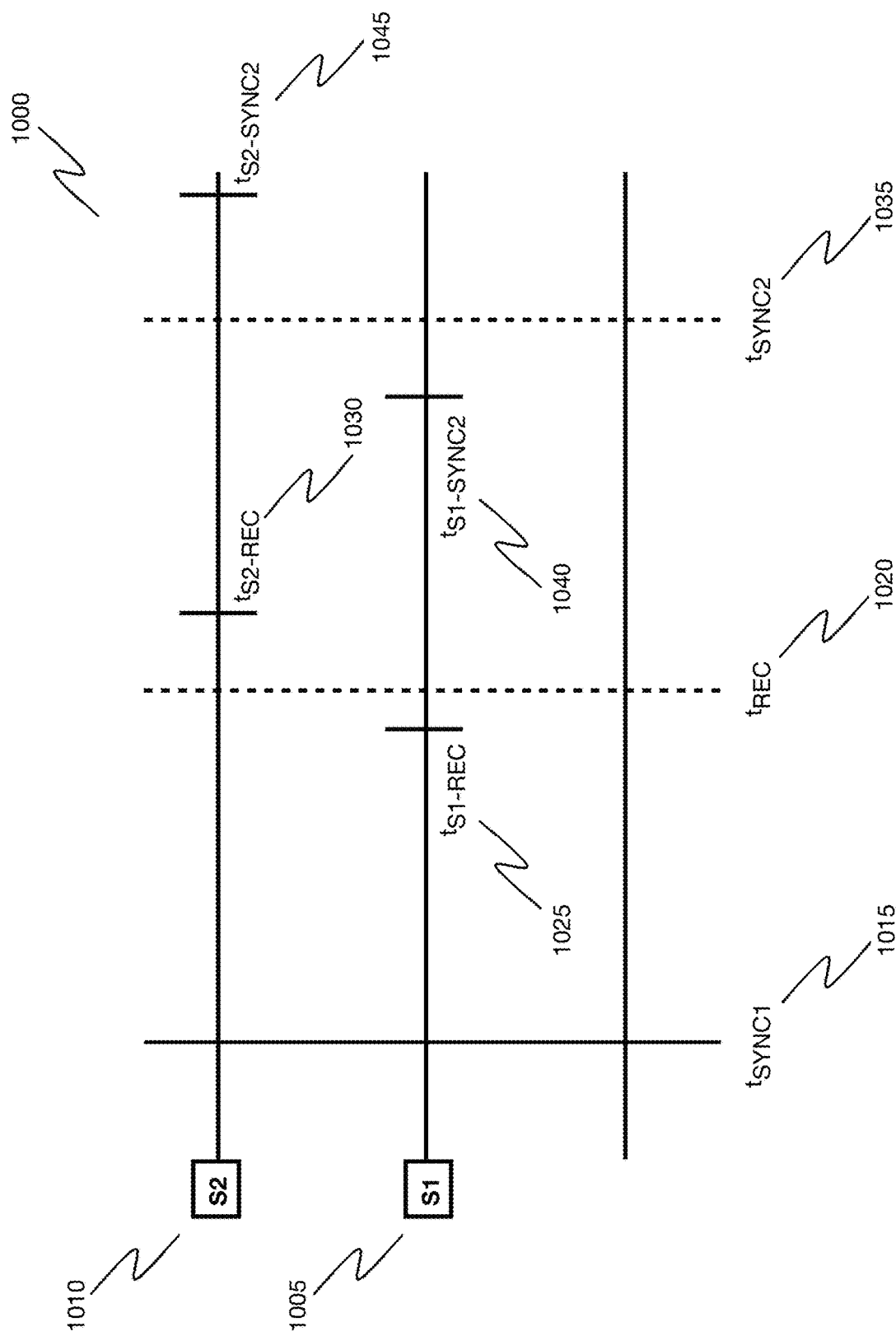

INTEGRITY ASSESSMENT OF A PIPELINE NETWORK

CROSS-REFERENCE TO RELATED APPLICATION

This application claims priority under 35 U.S.C. 119 to Provisional Application No. 62/503,105, filed May 8, 2017, which is incorporated by reference.

TECHNICAL FIELD

This description relates to sensing vibrations at multiple points in a pipeline network.

BACKGROUND

Pipeline networks are used to deliver a variety of fluids, with perhaps the most common pipeline networks being those used to deliver water.

SUMMARY

A sensor-based system may be used to detect a leak in a pipeline network. In such a network, a loss of pipeline integrity caused by a leak results in the choked flow of escaping fluid (e.g., water) from the pipeline network and local turbulence in the fluid in a pipe. Energy is propagated away from the leak site through the fluid in the form of a traveling wave. At the leak site, the magnitude and frequency pattern of turbulent energy depends principally on the fluid pressure in the pipe and on the geometry of the leak orifice: a larger leak orifice relative to the pipe's cross-sectional area will tend to result in a lower level of turbulence with energy at lower frequencies. The wave is attenuated as it travels away from the leak site origin. The level of attenuation at different frequencies depends on the properties of the pipe, which acts as a waveguide. Spectral transformation, or filtering in frequency, also occurs as the traveling wave crosses boundaries between different pipe sections and traverses pipe fittings, such as valves or meters. The traveling wave disturbs the fluid flow and causes variations in pressure. The energy of the traveling wave can be sensed as a variation in fluid displacement, e.g., by an optical sensor, as a variation in flow velocity, e.g., by a hydrophone, or as an acceleration against the wall of the pipe, e.g., by a piezoelectric accelerometer. These three types of sensors transduce the energy of the traveling wave to an electrical signal, which may be converted to sound.

The sensor-based system may include sensors deployed at sensing locations in the pipeline network that are selected for sensing vibrations emanating from leaks. Each sensor regularly records and processes vibration signals, and communicates with a local or remote controller via a wireless transceiver. The controller communicates with an analyzer, either locally, e.g., through a cabled connection, or remotely, e.g., through an internet connection.

In one exemplary system, the sensors are battery powered and operate primarily in a sleep mode in order to conserve energy and prolong battery life. The sensors are constructed in a rugged housing suitable for deployment on the pipeline network. For example, sensors may be fitted to an above-ground hydrant, attached to an underground pipe, or installed in a valve chamber. The attachment of a sensor to the pipeline network facilitates the sensing of vibration signals. These vibration signals may originate from a leak source, noise in the pipeline network, such as fluid flow, turbulence through valves, turning meters, and other in-pipe sounds, or ambient noise outside the pipeline network, such as traffic. After the vibration signal has been transduced to an electrical signal, electrical noise may be introduced, either from the electronic circuit or from electrical interference, via electromagnetic or electrostatic induction from environmental sources such as machinery or power lines.

In one particular implementation, a sensor including a hydrophone is fitted to an above-ground hydrant, such as in a removable cap on the hydrant or through integration into an electronics system of the hydrant.

In the system, a controller may include a wireless transceiver, that is local or remote to a sensor, for exchanging data between a sensor and an analyzer. A local wireless implementation may include a low-power frequency hopping, spread spectrum radio that is suitable for communicating with a nearby sensor. Such a controller might be a handheld device connected directly to an analyzer. A remote wireless implementation may include a cellular modem connected to or integrated with a sensor, suitable for communicating with a cellular wireless network. Such a controller may include software and hardware necessary to convey data to and from an analyzer via the cellular wireless network and an internet connection.

The system may be designed to reduce the cost of system ownership. The cost of ownership is a function both of the cost of the sensors deployed and the ongoing cost of operating the sensor network. The material cost of the sensors depends principally on their energy requirements, with larger batteries and remote wireless communication means generally increasing sensor cost, while operating cost is correspondingly decreased. Reducing the cost of ownership is best achieved by deploying sensors in a manner that increases the likelihood of detection of leaks, reduces the number of sensors required, lengthens the useful operating life of the system, and increases operational autonomy by reducing the necessary labor.

The total cost of ownership of a sensor system has three inter-related costs: (A) the purchase cost of all equipment, (B) the operational cost of using the sensor system, and (C) the maintenance cost of the sensor system. The operational cost is effectively the cost of communicating with all sensors. A sensor that must be read locally, for example, either by a mobile user or by a ground-based or air-based unmanned vehicle, cannot issue an alert in real-time because of the absence of a local controller to receive that alert. A sensor with a network connection is able to issue an alert, but at a higher equipment cost. The maintenance cost of a sensor is effectively the cost of replacing either a sensor or its battery. The integrity of both the sensor and its battery can be determined by communicating normally with the sensor.

The inter-related costs depend on the architecture of the sensor system. The described sensor systems may reduce the total cost of ownership by reducing the energy usage of a sensor and by reducing the total number of sensors needed for effective sensing of a pipeline network. In addition, the operational cost of the sensor system is reduced by minimizing the time and labor spent communicating. The maintenance cost is reduced by minimizing the energy usage of a sensor, which requires a lower-cost battery and a greater interval between battery replacement.

In the system, the sensors periodically record and process vibration signals to produce sensor data, and communicate that sensor data to a controller. The parameters and methods for recording, processing, and communicating are stored in protocols, which are data sets containing instructions that may be sent to one or more sensors by a controller. Examples of protocol values might include the times of day that the sensor initiates communication and the interval between communications. When instructed by a protocol, a sensor may record vibration signals at a precise time, and subsequently send that recorded data to an analyzer, via a controller. The controller may time-align, or synchronize, the recordings from two or more sensors, in order to take advantage of leak sound correlation techniques for locating the origins in the pipeline network of leaks.

In another example, a protocol may instruct a sensor to record and process vibration signals at regular intervals, such as, for example, nightly at a particular time each night. The processing may include filtering and estimation techniques that seek to characterize consistent small signals, potentially due to leaks, that may be beneath the threshold of detection in either pipeline or ambient transient noise.

An analyzer may in general be any computing device capable of presenting information to a user. In one implementation, an analyzer may be a handheld tablet computer capable of displaying maps with geographical representations of sensor locations and sensor data. An analyzer may further include information about pipes and associated components (e.g., valves and hydrants) to allow the analyzer to assess the relative usefulness of different locations for sensing leak vibrations. An analyzer may present information about the integrity of the pipeline network to the user, for example, as a list of suspected leak locations. An analyzer may also display, or convert to audio for playback, recorded vibration signals. An analyzer may also display sensor data, including the results of processing by a sensor of the recorded vibration signals, and may perform additional processing and analysis to create new information for assessing the integrity of the pipeline network.

In one general aspect, a system for sensing vibrations on a pipeline network includes one or more vibration sensors, a controller that exchanges data with the sensors, and an analyzer that serves as an interface to the controller. Each sensor includes a transducer that converts a vibration signal to an analog electrical signal, a digitizer that converts the analog electrical signal to a sequence of numerical values, a first timekeeper, a processor that processes the sequence of numerical values, and a first wireless communication module. The controller includes a second wireless communication module, and a second timekeeper.

Implementations may include one or more of the following features. For example, the transducer may be a pressure transducer that produces the analog electrical signal to represent pressure, and the pressure transducer may be a hydrophone incorporated in a hydrant of the pipeline network. The processor may be configured to process the sequence of numerical values to identify a time-varying component of pressure in fluid in the pipeline network and a time-invariant component of pressure in fluid in the pipeline network.

The transducer may include a light source and an optical sensor for measuring the changes in displacement of a vibrating surface. The transducer may be attached to the vibrating surface via a damped mounting such that the optical sensor may sense relative changes in displacement between the optical sensor and the vibrating surface. More generally, the transducer may be not attached to the vibrating surface such that the optical sensor may sense relative changes in displacement between the optical sensor and the vibrating surface.

The sensors may be located based on information about the pipeline network, and designated available sensor locations, which are used to evaluate sound paths from points in the pipeline network to sensor locations. The sensors may be assigned to a selected subset of sensor locations, and the sensor locations of the selected subset may be selected to maximize the total lengths of sound paths within acoustic range of the subset of sensor locations, or to maximize an expected value benefit accruing from the subsequent detection of leaks by the sensors. For example, the expected value benefit may be the expected value of water that would be recovered from the detection of leaks by the sensors that would otherwise have been lost. The designated sensor locations may be modified based on modifications in the evaluated sound paths that can result from changes in information about the pipeline network provided by actual leaks.

Software of the processor of the sensor may contain one or more protocols that have been received from the controller. The received protocols may include protocols for recording, processing, or communicating. Protocols that have been received may have been sent by the analyzer in response to setting a location of the deployed sensor, or in response to evaluated sound paths in the pipeline network.

A series of vibration recordings made at one or more sensors may be processed as an ensemble, and the processing may include the estimation of a quiescent vibration pattern. The processing also may include the estimation of a measure of self-similarity to enhance the estimate of a quiescent vibration pattern. The processing also may include applying an estimator having characteristics obtained from the analyzer to enhance the estimate of a quiescent vibration pattern.

In another general aspect, a system for synchronizing one or more sensors sequentially at different times with a controller includes one or more sensors and a controller. Each sensor includes a timekeeper, a means of reading and adjusting values of the timekeeper, and a wireless communicating means to receive timestamp-related values. The controller includes a timekeeper, a means of reading values of the timekeeper, and a compatible wireless communication means to send timestamp-related values to one or more sensors.

Implementations may include one or more of the following features. For example, the value of the timekeeper of the sensor may be set using the transmitted adjusted timestamp value of the controller, the adjusted timestamp value of the sensor, or both.

The wireless communicating means of a sensor may cause the reading of one or more values from the timekeeper of the sensor when receiving and the wireless communicating means of the controller causes the reading of one or more values from the timekeeper of the controller when transmitting.

In another general aspect, a system includes one or more sensors, each of which includes a transducer that converts a natural energetic phenomenon to an analog electrical signal, a digitizer that converts the analog electrical signal to a sequence of numerical values, a timekeeper, a processor that processes the sequence of numerical values, and a wireless means to receive timestamp-related values. A sensor may be programmed to perform a synchronization on at least two occasions in relation to the time of a scheduled recording of a sequence of numerical values.

Implementations may include one or more of the following features. For example, the wireless means to receive timestamp-related values may be a GNSS receiver. The sequence of numerical values may be shifted in time by an amount determined from the synchronizations performed.

The details of one or more implementations are set forth in the accompanying drawings and the description below. Other features will be apparent from the description and drawings, and from the claims.

DESCRIPTION OF DRAWINGS

FIG. 7 is a table showing an example of a power budget for a sensor of the system of FIG. 1.

FIG. 10 is a timing diagram.

Like reference symbols in the various drawings indicate like elements.

DETAILED DESCRIPTION

Figure 1:
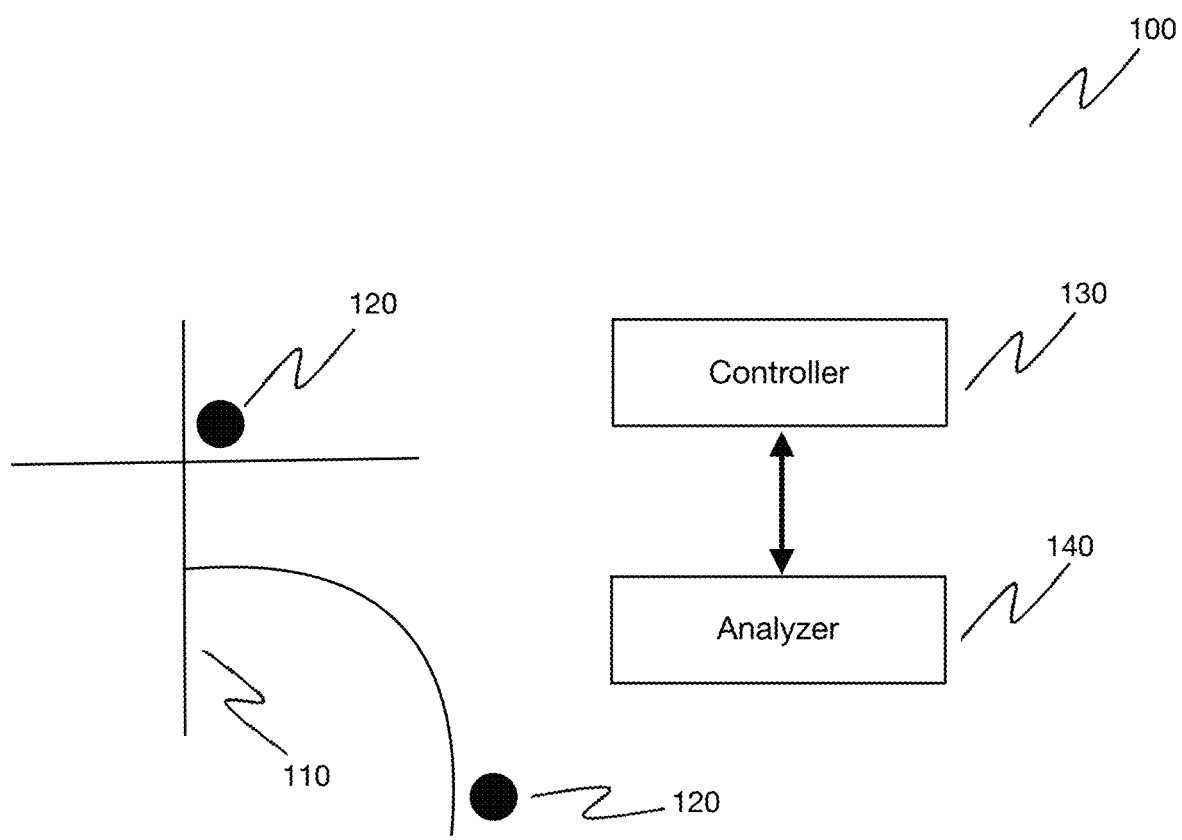
FIG. 1 is a block diagram of a system for analyzing vibrations of a pipeline network.

Referring to FIG. 1, a system 100 for analyzing vibrations of a pipeline network 110 includes sensors 120, a controller 130, and an analyzer 140. The sensors 120 are connected to elements of the pipeline network, including, for example, pipes, valves, meters, hydrants, and other pipe fittings. The controller 130 communicates wirelessly with sensors 120, which typically either use a low-power local radio or a high-power network radio such as a meter reading radio or a cellular radio. The analyzer 140 communicates with the controller 130, typically using either a direct cabled connection or an internet connection.

Underground drinking water pipes in the U.S. have a replacement cost in excess of one trillion dollars. There are currently efforts to establish best practices for asset management, which emphasize capital budget planning for pipe replacement at fixed intervals, such as 40 to 60 years. The described systems may be used to inform asset management decisions by replacing pipes only when there is lifetime historical evidence of stresses and failures that would warrant replacement, thereby creating the potential for significant capital savings.

Figure 2:
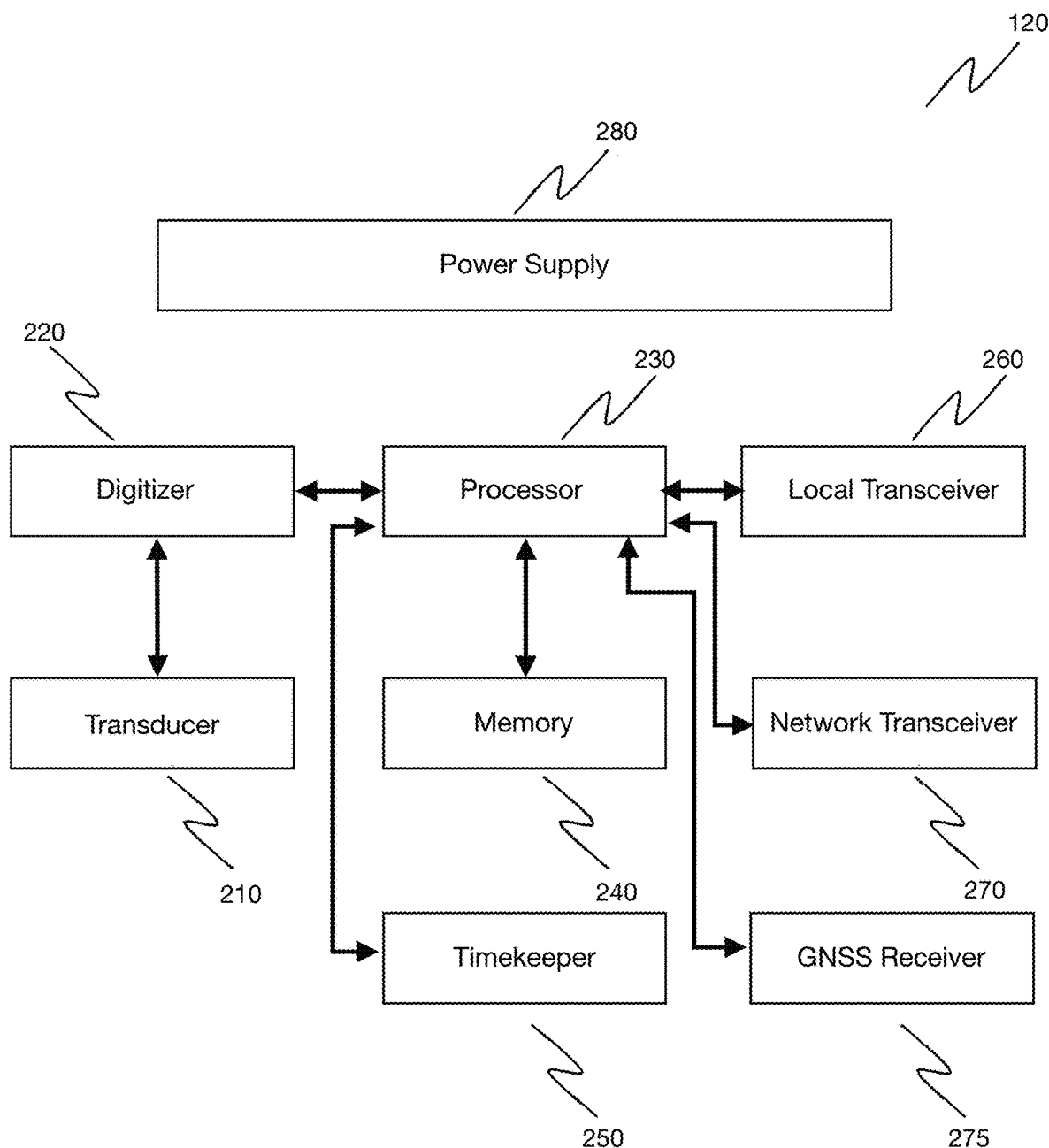
FIG. 2 is a block diagram of a sensor of the system of FIG. 1.

Referring to FIG. 2, a sensor 120 includes at least a transducer 210 for converting vibrations to an electrical signal, a digitizer 220 for converting the electrical signal to a digital signal, a processor 230, memory 240, a timekeeper 250, either a local transceiver 260 or a network transceiver 270, an optional GNSS (Global Navigation Satellite System) receiver 275 for receiving information about the current time and the location of the sensor, and a power supply 280. The electrical signal output from the transducer 210 is presented to the digitizer 220, which outputs digital values that are processed by the processor 230 and stored in the digital memory 240. At particular times indicated by the timekeeper 250, the power supply 280 energizes the transducer 210, digitizer 220, digital memory 240, and parts of the processor 230 needed to perform the transduction, digitizing, and processing of a vibration signal. The processed vibration signal is subsequently communicated to a controller 130 using either the local transceiver 260 or the network transceiver 270.

Vibrations are an example of a naturally occurring energetic phenomenon, which may generally be converted—or transduced—by a transducer to an electrical signal. Naturally occurring energetic phenomena occur in many forms, for example, as heat, wind, flow, pressure, or other forms. They may be referred to differently in different contexts, for example, depending on the style of transducer. As an example, vibrations in a fluid may be referred to in terms such as pressure variations, sound pressure, flow disturbances or acceleration forces, among others.

In one implementation, the transducer 210 may be a stack of one or more piezo-electric crystals or a micro-electromechanical system (MEMS) that senses acceleration and outputs a vibration-dependent electrical signal. The crystal stack or MEMS sensor is rigidly connected to a surface that is accelerating due to an incident input force. In another implementation, the sensor may be a hydrophone that senses acoustic vibrations as time-varying pressure and outputs a vibration-dependent electrical signal. The hydrophone sensor is placed in contact with the fluid in the pipeline network.

In another implementation, the transducer 210 may be a pressure transducer, in which a sensing element, such as piezo-electric material, is brought into direct contact with the fluid in a pressurized pipe. The pressure transducer senses either the displacement of a pressure wave or the velocity of a pressure wave (i.e., the first derivative in time of displacement), and outputs an electrical signal. Such a pressure transducer is often referred to as a hydrophone, and is essentially a microphone with acoustic impedance appropriately matched for sensing sound in fluid. A direct point of contact between the transducer and fluid is required. This point of contact may be in the form of a sealed hole made through a pressure plate of a hydrant, a wall of a pipe, a component of a valve, or a cavity of a meter interior. A benefit of a hydrophone sensor is that it generally is both very sensitive in sensing fluidic vibrations and very insensitive to vibrations that emanate from outside the pipe network, such as ambient noise from traffic. These benefits are somewhat offset by the need for direct contact with the fluid in the pipe.

The pressure in the fluid of the pipe includes a time-varying component and a time-invariant component. The time-varying component of the vibrations present in the fluid of the pipe may represent energy from leaks, normal flow, or other vibrations conducted through the fluid, such as the rotation of a meter, which may be referred to collectively as pipe sounds. The time-invariant component of the pressure of fluid in a pipe is referred to as fluidic pressure and may be in the form of static pressure if the fluid is moving or total pressure if the velocity of the fluid is zero. A pressure transducer may therefore record pressure signals that have information about both energy emanating from leaks and values of fluidic pressure at different times in the pipe.

Combining these two measures (i.e., time-varying and time-invariant pressure signals) can be advantageous. For example, it is beneficial to record pipe sounds when the fluidic pressure is greatest because the amplitude of the pipe sounds is typically proportional to fluidic pressure and because the fluid flow rate, which is a source of noise, is typically inversely proportional to fluidic pressure. The absolute level of fluidic pressure, and its diurnal variations, may provide useful information about the strain experienced by the pipeline network, with high levels or variations in fluidic pressure being a source of stress, and hence reduced life expectancy, for pipe assets.

A hydrophone, provided in a hydrant, a pipe, or another component of a pipeline network, is capable of measuring or estimating both fluidic pressure and leak sounds, which results in an efficient and highly integrated sensor.

A hydrophone may offer significant advantages over a piezoelectric element, which, when mounted to a structure like a fire hydrant, will sense incidental acceleration from leak sound waves traveling through the water in the pipe. This incidental acceleration is often attenuated to a level significantly below the levels of local flow vibrations in the pipe and ambient vibrations, resulting, for example, from wind or traffic. Use of a hydrophone, built into a fire hydrant, offers significant advantages, such as, for example, that it is in direct contact with the water, so the leak and local flow signals are stronger; it is insensitive to ambient vibrations emanating from outside the hydrant; and the DC output of the hydrophone is the fluidic pressure of water in the pipe, which is a useful indicator of stress on the pipe. Pipe information collected over time about the fluidic pressure, temperature, and leaks will be very valuable in extending the service life of pipes and predicting failures.

Figure 3:
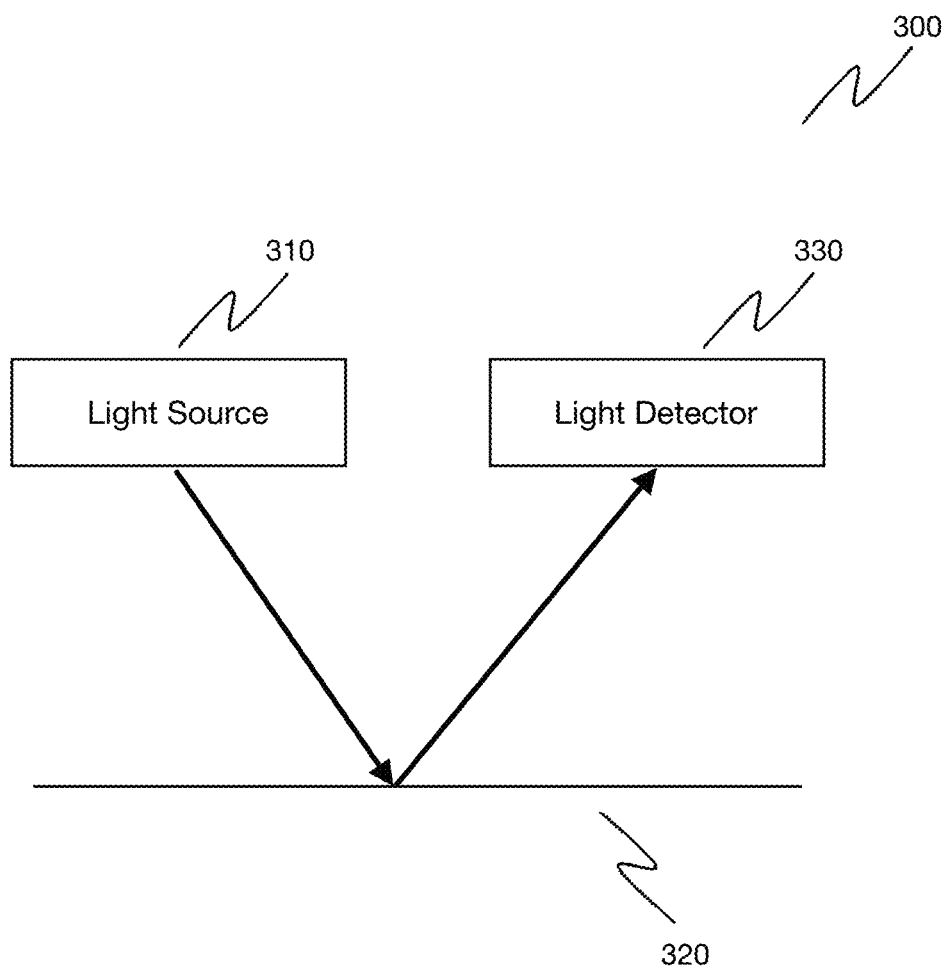
FIG. 3 is a block diagram of an optical transducer of the sensor of FIG. 2.

Referring to FIG. 3, in yet another implementation, the transducer 210 may be an optical transducer 300 that employs a light source 310 that emits focused light towards a displacement surface 320 such that some of the light is reflected towards a light detector 330. The optical transducer 300 senses movements of the displacement surface 320 due to an incident force and outputs a vibration-dependent electrical signal. The displacement surface 320 may be any interior or exterior surface of a pipe or another element of a pipeline network. Ideally, the displacement surface 320 moves independently of the light source 310 and light detector 320. In one implementation, the optical transducer 300 is handheld. In another implementation, the optical transducer 300 is mechanically connected to the displaced surface via a damped mounting that allows the displaced surface to move relative to the light source 310 and light detector 320. For example, the light source 310 and light detector 320 may be attached to the displaced surface using a soft rubber mounting. The optical transducer may include a focused light source and a matching light detector, such as a laser interferometer, that allows the measurement of relative motion between the laser interferometer and the displaced surface on the order of nanometers.

An optical sensor may offer significant advantages over a piezoelectric element, such as, for example, the optical sensor can be used externally, in that, for example, a handheld laser does not have to be in contact with the vibrating structure; the optical sensor has essentially no intrinsic noise and therefore may be higher resolution; and the optical sensor may be more robust and reliable long term.

Referring again to FIG. 2, in one implementation, the local transceiver 260 is a low-cost, low-power frequency-hopping, spread-spectrum radio system, operating in the license-free 2.4 GHz frequency range, such as the Coriandolo Radio hardware module and software protocol available from 64 seconds, Inc. The Coriandolo Radio module has a radio range up to several hundred feet and is suitable for communicating with a low-cost, portable, mobile controller 130.

In one implementation, the network transceiver is an LTE Cat-M1 cellular modem, such as the Nordic Semiconductor nRF91 module available from Nordic Semiconductor. The network transceiver communicates with the controller 130 via a cellular radio network.

Figure 4:
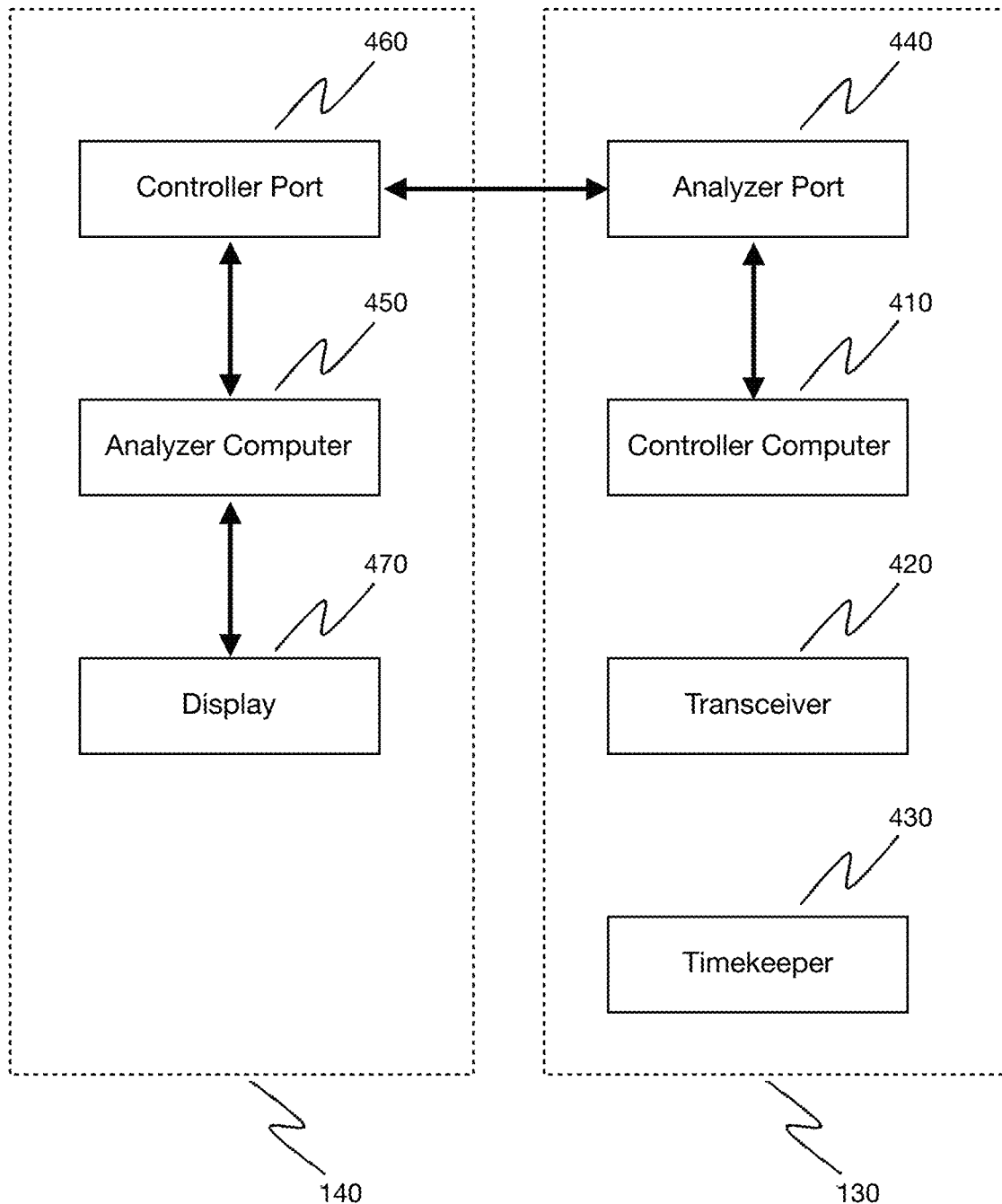
FIG. 4 is a block diagram of a controller and an analyzer of the system of FIG. 1.

Referring to FIG. 4, the controller 130 may include a controller computer 410, a transceiver 420 for communicating with sensors, a timekeeper 430, and an analyzer port 440 for communicating with an analyzer 140. In one implementation, the controller includes an internet-based set of computing hardware and services, such as Amazon Web Services, available from Amazon, Inc., which is capable of exchanging data via the internet with an analyzer, such as an iPad device, available from Apple Inc.

Referring again to FIG. 4, an analyzer 140 may include an analyzer computer 450, a controller port 460 for exchanging data with a controller, and a display 470. In general, the analyzer can be any type of computing device, including an internet-connected cloud server, a network computer, a personal computer, or a mobile computer, such as a tablet-based or phone-based device. In one implementation, the analyzer is an iPad device, available from Apple Inc. In another implementation, the controller 130 and the analyzer 140 are integrated into a single device, such as an internet-based set of computing hardware and services, such as Amazon Web Services, available from Amazon, Inc.

Figure 5:
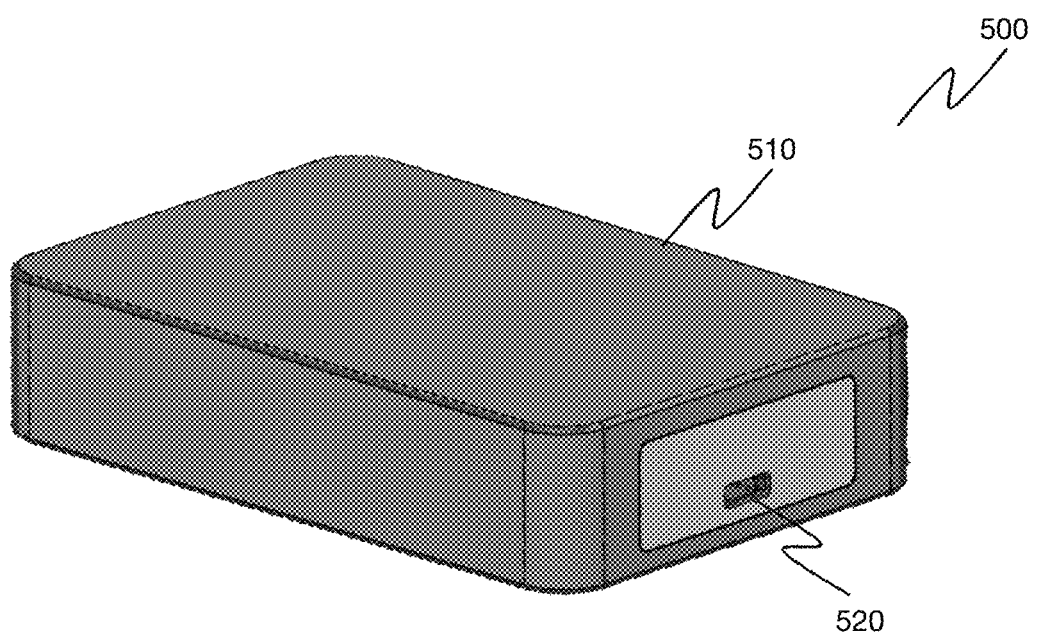
FIG. 5 is a perspective view of the controller of FIG. 4.

Referring to FIG. 5, in another implementation, a mobile controller 500 is housed in a small polycarbonate enclosure 510 with a USB-B micro receptacle 520 to facilitate connection to a computing device, such as a laptop or tablet computer, or a mobile computing device such as a phone or tablet. The controller is a small, portable device that uses the Coriandolo Radio module to exchange data with one or more sensors. Many such low-cost controllers can be used locally and simultaneously within a pipeline network by utility workers. The controller may optionally be connected to an analyzer 140, such as an iPad device, available from Apple Inc., via either a direct cabled connection or a radio link such as Wi-Fi or Bluetooth.

Figure 6:
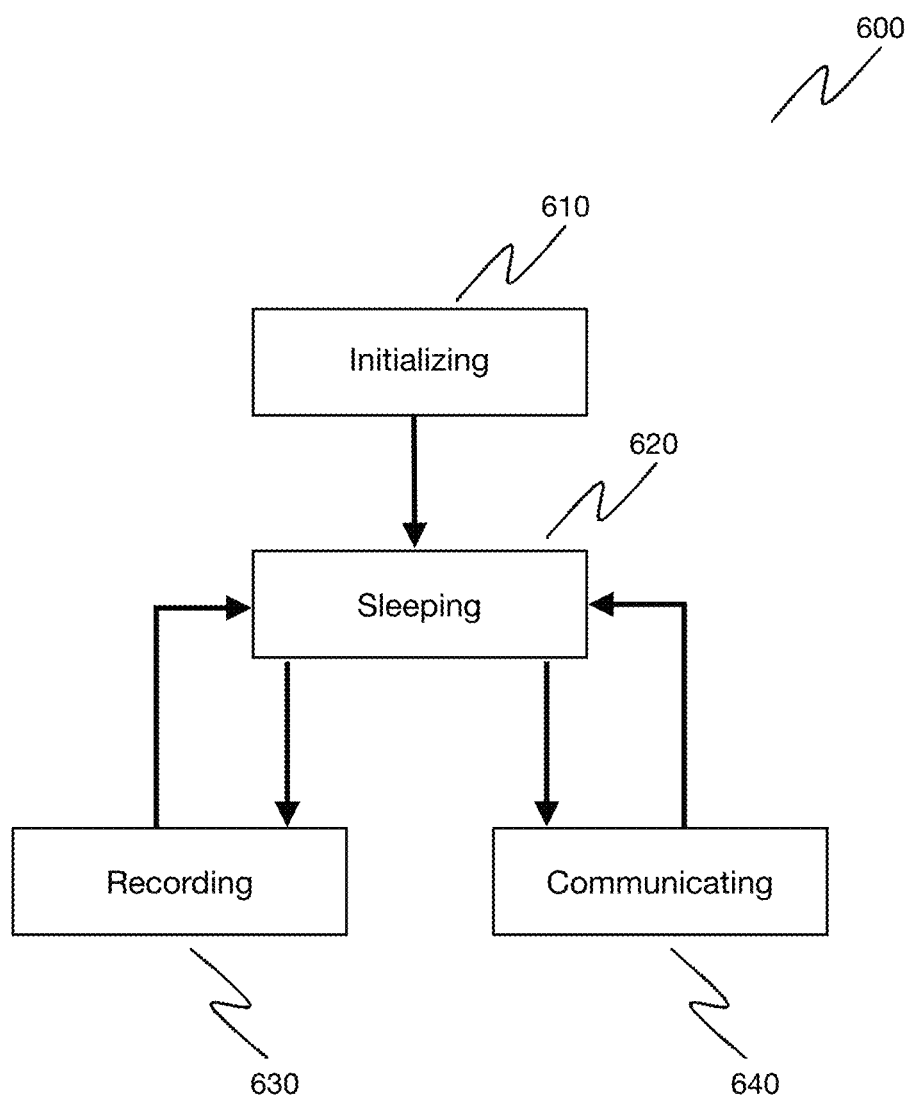
FIG. 6 is a block diagram of the lifecycle of a sensor of the system of FIG. 1.

Each sensor functions to characterize vibrations in corresponding sections of the pipeline network to enable the detection and pinpointing of the location of any leaks in the vicinity of the sensor. Referring to FIG. 6, a sensor has a lifecycle 600 that refers to the states of its embedded software algorithm. After an initializing state 610, either in the factory or elsewhere if the sensor is undergoing maintenance, the sensor usually operates in a sleeping state 620 so as to conserve the energy of its battery.

Under programmatic control, the sensor may enter one of two active states: a recording state 630 and a communicating state 640. In the recording state 630, the sensor samples and processes vibration data. In the communicating state 640, the sensor exchanges data with a controller 130. After recording or communicating, the sensor returns to the sleeping state 620.

Referring to FIG. 7, a power budget 700 for a sensor may usefully include estimates of energy usage during the sleeping, recording, and communicating states, accounting for communication with both local and network radios. The sensor at all times incurs the quiescent energy cost of sleeping, which, in one implementation, may be nominally budgeted to be 10 microWatts of continuous power. During the recording state, the sensor energizes the transducer 210, digitizer 220, processor 230, and memory 240. And, in one implementation, nominally consumes 30 milliWatts of continuous power (i.e., three thousand times the power consumption of sleeping). The sensor may attempt to communicate frequently, using its local radio, and nominally consumes 60 milliWats for short periods during the day, Power consumption during communicating with a network radio may be nominally budgeted to be 750 milliWatts, which is representative of a cellular modem. Daily energy usage may be expressed in milliWatt-seconds, namely the power consumed multiplied by the time period of that consumption.

Thus, daily energy usage in a sensor is dominated by the energy used for communicating. Since sensors are typically required to be low-cost and physically small for installation in small spaces, the material cost of a sensor is essentially driven by the power supply requirements, which incentivizes minimizing energy usage while communicating and minimizing the time spent communicating.

Figure 8:
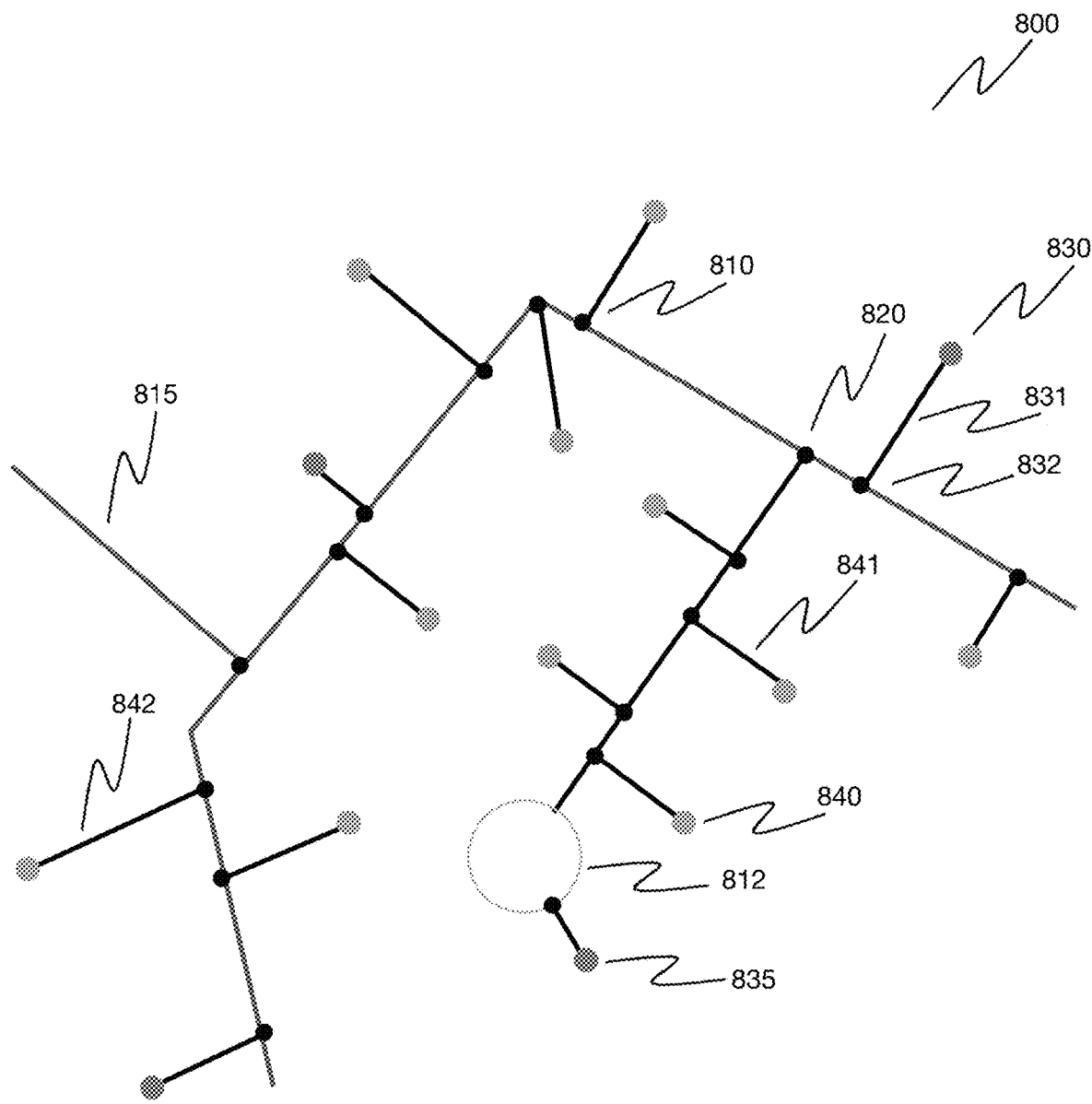
FIG. 8 is a map illustrating a pipeline network.

Referring to FIG. 8, a water pipeline network 800 may include components such as water distribution main pipes 810, main valves 820, hydrants 830, hydrant lateral pipes 831, water service meters 840, water service lines 841. A breach of pipeline integrity, such as a water leak or an unauthorized flow, may occur anywhere in the pipeline network. Sensors may be deployed in or on a hydrant 830, which is an advantageous installation point due to its general accessibility and proximity to a water distribution main pipe 810. Unlike main valves 820 and water service meters 840, hydrants are usually located above ground, making them suitable for line-of-sight radio communications with a controller.

Existing systems permanently install vibration sensors to monitor a pipeline network for evidence of leak sounds. Typically, the sensors are installed on pipeline components, like valves or hydrants, at similar distances apart in an effort to achieve uniform coverage of the pipes. Each sensor operates on its own lifetime battery and records vibrations, typically using an accelerometer based on a piezoelectric sensing element. The sensor processes sound recordings made at regular intervals. A leak sound is usually defined as an unusually high sound level—significantly above pre-programmed average background sound levels. Some brands of sensor are programmed to track average background sound level within the sensor using historical recordings. The sensor typically attempts to determine from aggregate recordings some useful figure of merit, like a leak index, which it can then transmit.

A water utility might deploy tens, hundreds or even thousands of sensors, which are read periodically, usually by radio, either short range, cellular, or a combination. Data for one utility is usually examined by utility personnel in a software program, often with sensors overlaid on a map.

The water utility will typically purchase fewer sensors than there are available sensing points due to cost. Accordingly, it is useful to quantitatively determine where the sensors should be installed so as to optimize their usefulness. For example, it may be misleading to place them at equal distances apart, as leak sounds may be sensed more easily at some locations (such as locations that have better sensor contact or lower environmental noise). In addition, leak sounds may travel directionally and leak sounds from different origins (e.g., small pipe, large pipe, plastic pipe, metal pipe, meter, valve) will travel longer distances in some pipe sections, based on size, material, pressure, ground packing, and flow patterns. In addition, remediation of some leaks is more valuable than remediation of others because of the amount of water lost (due to, for example, pipe size and pressure), the cost of repair (such as, for example, pipes running under highways or in densely populated areas), the economic cost of service disruption (such as, for example, transmission mains or pipes supplying agriculture or hospitals), and the potential for material harm to persons or property (such as, for example, leaks that may cause flooding, landslides, or the collapse of a structure). These factors are generally hard to predict, which enhances the value of being able to deploy sensors at optimal sensing locations thereby maximizing the probability of detecting leaks.

By using a parameterized model, based on pipe characteristics, a more optimal subset of sensing locations may be determined computationally. With this approach, sensors are first deployed at an initial set of locations and the expected value of discovered leakage is computed. The expected value is a mathematical statistical concept that seeks to maximize the volume of discovered leakage, based on estimates of the size and count of discovered leaks. Sensor locations are then added or subtracted from the first deployment and the revised expected value of discovered leakage is again computed. The process is repeated until no further improvement in the expected value of discovered leakage is obtained. This approach may be used to allocate a fixed number of sensors optimally or to determine the number of sensors needed to achieve an expected level of performance. The level of performance may, for example, be the expected value of total discovered leakage, the expected value of discovered leakage per sensor, or some other performance metric. The system also may re-compute sensor locations, during the operating life of the sensors, based on historical performance. By aggregating data from multiple pipeline networks, the system may inform the deployment of sensors in a particular network using information gained regarding sensor deployment in other networks.

Figures 9A, 9B, 9C:
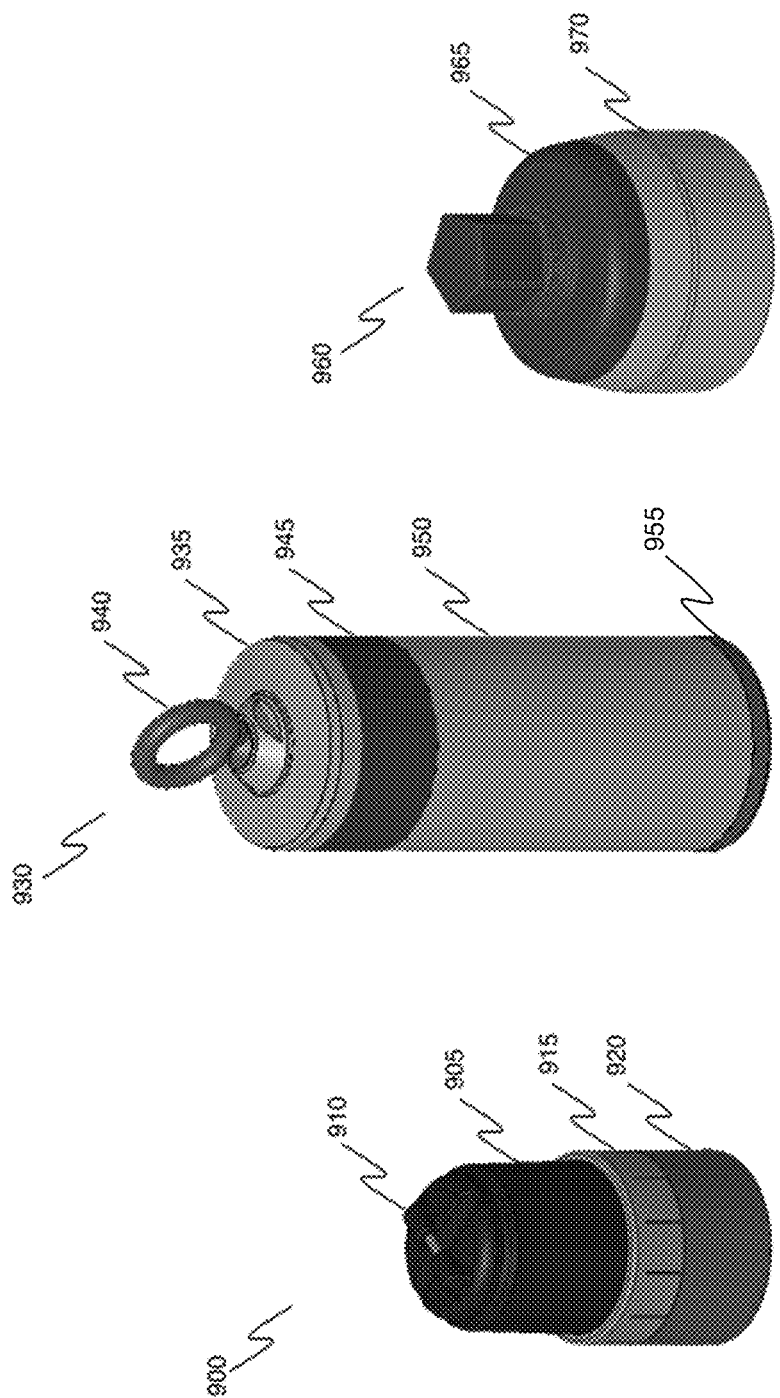
FIGS. 9A-9C are perspective views of housings of sensors of the system of FIG. 1.

Referring to FIG. 9A, in one implementation a sensor is constructed in a rugged, water-proof housing 900 with a polycarbonate top 905, a steel lifting pin 910, a steel locking ring 915, and a steel base 920 with a built-in magnet. A housing with such a form factor is suitable for a sensor that will be temporarily installed on a pipe, meter, fire hydrant, or other pipe fitting. The steel base may usefully function as an electromagnetic shield and a surface for a transducer that senses vibrations. The polycarbonate top 905 is transparent to radio signals. The steel locking ring 915, together with an O-ring, forms a water-proof seal for the sensor and the transducer and electronics contained within the housing 900. The steel lifting pin 910 may be used with a cord, made of steel or another suitably tough material, to secure the housing to a pipe appurtenance or other structure.

Referring to FIG. 9B, in another implementation a sensor is constructed in a cylindrical housing 930 with a steel top 935, an eyebolt 940, a polycarbonate ring 945, a steel tube 950, and a steel base 955 with a built-in magnet. A housing 930 with such a cylindrical form factor is suitable for lowering into an underground space, such as a valve chamber.

Referring to FIG. 9C, in another implementation a sensor is constructed in a rugged cap housing 960 with a polycarbonate shell 965 and a steel or brass outlet fitting 970. Alternatively, the outlet fitting may be connected indirectly to the hydrant via a brass or steel adaptor. The polycarbonate shell 965 is transparent to radio signals. The cap housing 960 is a fully functional replacement for a standard fire hydrant cap, but has an integrated sensor 120. The cap housing 960 may usefully be connected to the hydrant as a standard hose nozzle or steamer nozzle cap.

Having described the components of a sensor system 100, operation of the system to detect leaks will now be described with reference to the underlying physics of leaks and associated equations.

A sound path exists in any particular section p of pipe. When energy of a leak, as a traveling wave x(n), enters a pipe section at discrete time n, the energy is filtered by an equivalent pipe-section filter h(n). This pipe-section filter represents the frequency shaping and attenuation with time and distance that the pipe section asserts on the traveling wave. The traveling wave may leave the pipe section via a fitting, which may be modeled by a filter b(n), and continue traveling in another pipe section that may be similarly modeled. After passing through the pipe section p and its fitting the modified traveling wave is denoted by y(n):

$$y_p(n)=(x_p(n)\otimes h_p(n))\otimes b_p(n) \qquad (1)$$

Between the origin of a leak and any particular sensor there will be one or more pipe sections (i.e., sound paths) and their fittings. Each pipe section is governed by Equation 1, so that the output from pipe section p becomes the input to pipe section p+1:

$$y_p(n)=x_{p+1}(n)$$

$$y_{p+1}(n)=(y_p(n)\otimes h_{p+1}(n))\otimes b_{p+1}(n) \qquad (2)$$

Equation 2 suggests that the attenuation from h(n) and b(n) progressively reduces the level of leak sound so that some sensing locations may be unable to register the attenuated leak sounds in the presence of background noise. Leak sounds are differently attenuated in frequency by different pipe sections. Equation 3 transforms the time series y(n) to a spectral representation y(k), for discrete frequencies k, via the discrete Fourier transform:

$$y(k) = \sum_{n=0}^{N-1} y(n)\cdot e^{\frac{j2\pi n}{N}} \qquad (3)$$

Equation 2 can be re-written in terms of the frequency domain by replacing convolution operations ($\otimes$) with multiplication operations:

$$y_{p+1}(k)=(x_{p+1}(k)\otimes h_{p+1}(k))\otimes b_{p+1}(k) \qquad (4)$$

Equation 4 suggests that no leak sound will be propagated from one pipe section to the next unless some of the spectral energy in x(k) is passed by h(k), and b(k). The transition of the leak sound between a pipe and a connected pipeline element, such as a fire hydrant, is also represented by b(k).

Referring again to FIG. 8, while a simplified approach to placing sensors might be to place them evenly in either a grid pattern or with uniform spacing along pipes, more effective deployment strategies may be employed. In practice, there is a diminishing likelihood of sound reaching the sensor, either from more distant locations, or traveling through more pipe sections, or traveling through pipe sections composed of pipes with varying materials and diameters.

Leading away from any sensor there are a finite number of sound paths, that is, linear sequences of pipe sections and fittings. Sound from a leak, present somewhere on one of these sound paths, may propagate along that sound path towards the sensor and has a certain probability of being detected by the sensor, based on the characteristics of the leak sound and the equivalent filter functions of the pipe sections and fittings in that sound path. The acoustic range of a sensor, therefore, may be thought of as all the points along the sound paths emanating from a sensor for which there is a certain confidence that sound from a leak will be sensed by that sensor. The acoustic range is probabilistic rather than deterministic in nature. It will depend on a convolution of the characteristics (and type) of leak and the equivalent filers in the sound path and can be estimated by modeling these elements. But it also depends on other factors that cannot be predicted, such as environmental noise. Nonetheless, the concept of acoustic range is a useful way of thinking about how to deploy sensors spatially and how to assess pipe network coverage.

In one implementation, sparse coverage is obtained from a small number of sensors with the statistical goal of maximizing the expected volume of leakage detected over time. For example, a sensor placed on the mains hydrant 830 may sense leak sound from the hydrant lateral 831, the branch loop 812, and any connected service assets, such as service pipes 841 and meters 840. These sound paths include the transitions through the mains valve 820, the hydrant gate valve 832, the hydrant lateral 831, and the hydrant 830. In addition, a sensor placed on the mains hydrant 830 may sense leak sound originating in either direction along the main pipe 810, including, for example, leak sound originating from a more distant connected main 815. Some leak sounds, such as those originating in a more distant service pipe 842, may not be sensed because of the filtering operations described in equation 4.

Hydrant 830 is an advantageous sensing location because the total length of pipe, number of connected pipes, and connected elements through which leak sound may travel give hydrant 830 a greater acoustic range than that of many other hydrants, such as the hydrant 835 connected to the branch main 812. Leak sound from more distant sources, such as the connected main 815, must travel through more pipe sections, fittings, and appurtenances to reach hydrant 835 than to reach hydrant 830. In addition, the pressure of the branch main connected to hydrant 835 might be different to the pressure of the distribution main connected to hydrant 830 and sound propagation may be disrupted by changes in pressures.

In another implementation, optimal coverage is obtained from a number of sensors that is matched to the pipe network, with the statistical goal of detecting an expected percentage of all leakage volume. This deployment strategy seeks simultaneously to minimize: (A) the total length of pipes and the number of elements that are unlikely to fall within the acoustic range of any sensor, and (B) the total number of deployed sensors. By applying equation 4 recursively for p=0 to P−1 pipe sections, there is an overall equivalent filter a(k) between any leak source signal x(k) and the filtered signal y(k) arriving at any sensor:

$$y_p(k)=x_0(k)\cdot a(k)) \qquad (5)$$

In practice, the form of h(k) presented by a single pipe section depends on varying pipe pressure, the elasticity and cross-sectional area of the pipe, and how the pipe is physically set in the ground. In one implementation, pipes of a given type, material and diameter, in a particular area, may be assigned an initial common characteristic h(k). Similar connections, such as service-to-main pipe couplings and main or lateral valve connections, may be assigned an initial common characteristic b(k). Information about locations, distances, and types of pipes, fittings and other network elements, for example, from information contained in the analyzer, which may be the WaterPoint Network software application, available from 64 seconds, Inc., may be used to assign a characteristic a(k) for any sound path from an arbitrary location to any other location. Similarly, leaks from different types of pipes, such as distribution, lateral, branch, and service pipes, and different types of appurtenances, such as hydrants, valves, and meters, may have common characteristics. Typical leak sounds from sources such as pinholes or cracks may thus be assigned a common characteristic x(k). The expected leak sound y(k) at the sensing location may then be readily estimated from x(k) and a(k).

There are many useful approaches to selecting the total number of deployed sensors and their locations. In one approach, all hydrants are initially considered to be potential sensing locations. For each sensing location, the estimated acoustic range may be computed for the different types of leaks that may occur anywhere in the pipeline network. The sensing locations may then be ranked by the sum of the lengths of the sound paths that are in acoustic range, for each type of potential leak detectable. The sensing location, or hydrant, with the greatest acoustic range is selected as the first sensing point. The hydrant with the greatest non-overlapping acoustic range is then selected as a second sensing point. This process is repeated until the selection algorithm is terminated according to a desired endpoint criterion.

In one implementation, the endpoint criterion is the use of every available hydrant. This criterion over-samples some sound paths, maximizes the number of deployed sensors, and minimizes the likelihood of not detecting a leak. This endpoint criterion may be most appropriate in urban areas where the volume of water usage per pipe section or density of service pipes is very high.

In another implementation, the endpoint criterion is deployment of a fixed number of sensors that is less than the number of available hydrants. This fixed sensor-count criterion may be most appropriate in areas where the volume of water usage per pipe section or density of service pipes is more variable.

In yet another implementation, the endpoint criterion is the progressive deployment of sensors until a particular total length of all sound paths in acoustic range of one or more deployed sensors has been reached. In one alternative, the particular total length may be expressed as a percentage of the total length of all sound paths in the pipeline network. In another alternative, the particular total length may be greater than or equal to a pre-determined total length. In yet another alternative, the particular total length corresponds to attainment of some particular expected value benefit. For example, the expected value benefit may represent an average total sound path length per deployed sensor. In another example, the expected value benefit may be a likelihood that any leak in the pipeline network persists is detected by at least one of the deployed sensors. In yet another example, the expected value benefit may be the recovered value of lost water, which will likely increase for leaks detected in either larger pipes or pipes at higher pressure. In general, increases in the expected value benefit per sensor are likely to diminish as the number of sensors deployed is increased.

After the sensors have been deployed, leaks will occur in the pipeline network. The known locations of actual leaks and the actual sound data y(n) recorded and processed either by the sensors or by the analyzer can be used to modify assumptions made about common leak characteristics x(n), common pipe-section characteristics h(n), and common coupling characteristics b(n). These modified assumptions, or learning processes, can be used to re-run the approaches to selecting the total number of deployed sensors and their locations and therefore beneficially to re-deploy some sensors to new sensing locations. It may be noted that since diverse pipeline networks exhibit many similarities in leak and sound path characteristics, learning processes may be conducted in aggregate by the analyzer using any number of different pipeline networks and their particular sets of deployed sensors.

Once installed, the sensors may be programmed to operate according to protocols. A protocol is a set of rules that the sensor follows when performing tasks such as sampling, processing, and communicating. For example, the protocol for sampling may include the recording duration, an interval between recordings, a sampling rate, and other parameters that affect the sampling of the vibration signal. In one implementation, protocols may be organized as dictionaries containing key-value pairs, such as, for example, key="samplingRate", value="2048", where "samplingRate" specifies the sampling rate and "2048" indicates the value of 2,048 Hz to be used as the sampling rate.

Referring again to FIGS. 1 and 2, the processor 230 may be factory-programmed with one or more protocols and may also receive protocols at any time from a controller 130. A received protocol may contain some keys that the software of the processor has been programmed to use and some keys that the software of the processor is not able to process. Such a situation may arise when different versions of software exist in deployed sensors and it is desired that all processors are able use the same protocol with some keys being available only to some processors.

Using the analyzer 140, protocols may be changed locally, using a mobile controller, or remotely, using a network controller, either permanently or temporarily. A sensor may, for example, be instructed to communicate more often during a leak survey and less often during cold weather when remote communication will place a particular burden on the battery.

The software in the sensor can be thought of as a process that is normally doing nothing in order to save battery power, but performs tasks at different times, such as sampling and processing data, collectively termed recording, and communicating. The tasks can be parameterized. For example, recording might advantageously occur during the night, but may also identify consistently noisy times such as when there may be local irrigation flows. Or recording at very low temperatures will reduce battery life. More or less recording, processing, and communicating generally impacts battery life, leak detecting efficacy, and user experience. It makes sense to use protocols: namely to formalize and make variable the parameters of the tasks so that what is learned in a sensor, or in one or more pipeline networks, can be used to improve the performance of one or many sensors. While it may not be desirable or necessary to change the complete software program of a sensor, it can be useful in individual sensors to change formalized task parameters, like the scheduling of recordings or the coefficients of a particular software digital filter.

Referring again to FIGS. 2 and 6, a sensor awakes from the sleeping state 620 at different programmed times to enter the recording state 630 and perform sampling. Sampling is the acquisition of a sequence of numerical vibration data values, from the transducer 210, via the digitizer 220. Sampling is performed under the control of the processor 230 using a sampling protocol. Nighttime is an advantageous time for recording because the normal usage flows of water in the pipe are minimal, the water pressure of the pipe is at its maximum, and background noise tends to be reduced. In one implementation, the sensor makes a series of short recordings with a duration of one second each, such as, for example, thirty-two one-second recordings between midnight and 4 AM.

Referring again to FIGS. 2, 4, and 6, a processor 230 may perform recording 630 in order to detect or characterize the presence, appearance in time, or emergence over time of leak sounds within the acoustic range of the sensor 120.

Recalling that the acoustic range of a sensor is the total length of all sound paths through which a leak sound may travel from its origin to that sensor, it would be highly desirable to increase the acoustic range of a sensor. The acoustic range of a sensor 120 may be increased using the processor 230 to combine the results of recording 630 performed at different times. The acoustic range may also be increased by combining the results of recording 630 from the processors 230 of more than one sensor 120, using the computer 440 of the analyzer 140. These increases in acoustic range are achieved when an analyzer 140 can detect leak sounds that are otherwise indistinguishable from, or below the quiescent level of, the background noise in the vicinity of a sensor.

A series of r=0 to R−1 recordings provides information about the variability of sound in the pipe. In the presence of a leak sound, each recording can be modeled by:

$$y_r(k)=s(k)+n_r(k)$$

$$E[y_r(k)]=s(k) \qquad (6)$$

where y(k) is the spectrum of the recorded sound, s(k) is the spectrum of the leak sound, and n(k) is the spectrum of all other additive recorded noise, which may include environmental vibrations, like traffic, pipe vibrations, normal flow, and other noise effects, like pumps, meters, or electrical interference. The quantity E[ ] refers to the mathematical expected value. The series of R recordings may be equally spaced in time or the timing of recordings may be varied deterministically or randomly. For example, as noted above, the timing of recordings might usefully be concentrated at night, to avoid traffic or flow-related noise in the pipeline network. Random variations in timing of recordings may be helpful to avoid regular disturbances, such as nighttime irrigation.

The objective of processing the recordings is to detect and characterize s(k) without prior knowledge of its magnitude or form. Over time, s(k) may change more gradually than n(k) and both may appear as possibly-overlapping pink noise. One strategy is to identify the quiescent form of the recorded sound:

$$A_q = \min\left(\sum_{k=0}^{K-1} |y_r(k) \otimes g_m(k)|\right) \qquad (7)$$

$$r = 0 \ldots R-1, m = 0 \ldots M-1$$

where A is the amplitude, q is the quietest of the R recordings, as measured by the absolute value |•| of the recording y(k) filtered with a function g(k) of form m from a library of M possible such functions. At its simplest:

$$s(k)=y_p(k) \qquad (8)$$

The simple form of equation 8 is problematic because of the variability in y(k), as such an estimate of s(k) obtained from R=32 recordings each night may vary significantly from night to night. There is also the problem of selecting g(k) from M choices, which in one implementation may include a bank of bandpass filters that is either factory-programmed in the processor 230 or created in the analyzer 140 and sent to one or more sensors via the controller 130. The bank of M bandpass filters may, for example, be unbiased from an information point of view. In one implementation, it may be an octave bank where each successive filter m has a center frequency and bandwidth that are twice those of the preceding filter m−1 in the bank. Alternatively, the bank of bandpass filters may have predetermined functions known from the experience of previously discovered leaks in a pipeline network and taking into account particular sound paths. For example, a bandpass filter of 50-150 Hz may be useful for detecting leak sounds in the presence of plastic pipes with thin walls or diameters in excess of 150 mm. In another example, a bandpass filter of 600-800 Hz may be useful for detecting leaks sounds in the presence of copper pipes with a diameter of less than 50 mm. There are many such possible predetermined bandpass filters and it will be appreciated that more than one bandpass filter might be applied to create more than one estimate of s(k) at a particular sensor. In addition, analysis of historical leak sounds from one or more pipeline networks by the analyzer 140 may be useful in creating predetermined bandpass filter settings.

In another implementation, the optimal filter g(k) may be estimated from the recordings themselves, using the short-term tendency for n(k) to vary more than s(k):

$$g(k) = \sum_{r=0}^{R-1} \sum_{p=0}^{R-1} (|y_r(k)| \cdot |y_p(k)|) \otimes f(k) \qquad (9)$$

The product at any frequency k of the quantities |y(k)| for any pair of recordings r and p will likely be smaller where there is only stochastic noise and likely be larger where there is deterministic signal energy. For any frequency k, this product is arbitrarily scaled and may be distributed in a non-gaussian fashion, such as a chi-square distribution. It is therefore useful to convolve this product with a smoothing function f(k) such that the variability among close values of k is reduced and such that the filter g(k) has a range of 0 to a finite value. Equation 9 can be modified to its coherence form:

$$g_{rp}(k) = \frac{|y_{rp}(k)|^2}{y_{rr}(k) \cdot y_{pp}(k)} \otimes f(k) \qquad (10)$$

where $y_{rp}(k)$ is the cross-spectral density of x and y and $y_{rr}(k)$ and $y_{pp}(k)$ are the autospectral densities of $y_r(k)$ and $y_p(k)$, respectively. From equations 9 and 10, the function g(k) may approximate a scaled version of the signal to noise ratio, snr(k):

$$snr(k)=s(k) \div n(k) \qquad (11)$$

An estimate of the leak signal energy s(k) may be obtained using g(k), for example:

$$s(k)=E[g(k) \cdot y_r(k)] \qquad (2)$$

Both snr(k) and g(k) tend towards zero at any frequency k where there is no signal and towards a relatively large value where there is significant signal energy compared to noise. They tend towards an intermediate value where signal and noise energies are both present in roughly similar proportions. Equation 12 is precise at frequencies k where there is no spectral overlap between signal and noise, but the estimated signal is biased (under-estimated) at frequencies where there is spectral overlap. This is a problem with many classes of estimators of deterministic signals mixed with approximately gaussian noise, such as Wiener, Kalman, and Kolmorogov filters and newer derivations such as particle filters.

The estimator g(k) given by equation 9 will by its nature include errors due to variance in y(k), inherent bias, and any statistically nonstationary aspects of s(k), which may occur if the leak, and hence the leak sound, is evolving. The problem of variance can be reduced by increasing the ensemble size R so that more recordings y(k) may contribute to g(k). These recordings may be made at the same time from locations with roughly similar presumed noise characteristics. Alternatively, these recordings may be made over time, in some locations for example, over several months. However, this approach will fail in the presence of nonstationary conditions such as when noise or a leak signal appears at some time in an ensemble. An alternative approach is to use a weighted ensemble average of short-term estimates of g(k):

$$g(k) = \sum_{m=0}^{M-1} g_m(k) \cdot a_m(k) \quad (13)$$

The ensemble-averaged estimator uses M realizations of g(k), computed for example over one or more days, and summed using a weighting function a(k) that may optionally favor some realizations. For example, in one alternative, a(k) may be greater for more recent realizations of g(k). In another alternative, a(k) may be greater for quieter ensemble values of y(k) used in equation 9 or 10. The weighting function a(k) may also vary with the frequency k using an estimate of self-similarity in the ensemble of g(k) in a manner analogous to the approach of equation 9 or 10, for example. This approach is limited by the expectation for an increased bias in g(k) itself if the estimator of equation 13 lacks sufficient statistical power in the underlying ensemble of y(k).

In the detection of leak signal energy, the problem of the biased estimator can be reduced by using a global estimator. Referring to equation 9 and the previous discussion, the estimator g(k) is usually assumed to be computed from recordings made at a single sensor that may be sensing vibrations from a leak. There are alternative approaches to estimating the noise vibrations at the sensor. In one alternative, the values of y(k) recorded from one or more additional sensors may be used. Another alternative may use the values of y(k) from a different time period, such as, for example, a time period in which the presence of a leak is assumed to be unlikely. In yet another alternative, the aggregate values of y(k) from locations that may be expected to exhibit similar noise characteristics may be used. In still another alternative, simulated values of y(k) that have been generated from the study of quiet pipe recordings may be used. In general, it is possible to substitute values of y(k) from elsewhere since only the statistical properties are important and not the actual values of y(k).

The processing power of the sensor can be used to enhance the leak-detection performance in the sensor. Traditionally, a leak sound has been defined as a sound that is several times louder than the background or an intense sound with specific frequency patterns. But, more typically, a leak sound is low-level, adding less than 10% to the volume of recorded sound and is nondescript or hard to predict in its frequency pattern.

The mathematical approach of the described processing attempts to isolate, reveal, and characterize buried leak sound components of the recorded sound. This clarification of leak sounds is based on the statistical properties measurable in an ensemble of recordings, based on the relative consistency of a leak sound and the relative inconsistency or randomness of background sounds. Such a programmed sensor has the potential to be much more sensitive to typical low-level leak sounds and at the same time be more specific (have fewer false positives) in detecting potential leak sounds. The advantages are better leak detection performance, longer leak-detection range, and fewer sensors needed.

Referring to FIGS. 2 and 4, it is apparent that some parts of the processing described may be performed either within the processor 230 of the sensor 120 or within the computer 440 of the analyzer 140. Processing within the analyzer 140 is essential for global estimation, that is, any part of the processing that uses recordings from two or more sensors. Processing within the processor 230 of the sensor 120 allows the processor to make decisions about the presence of a leak signal and increase the quality of data transferred from the sensor 120 to the controller 130. The processing may also reduce the amount of data that must be transferred from the sensor 120 to the controller 130, thereby increasing the battery life of the sensor 120.

Regarding communication, in one implementation, the sensor 120 initiates communication with the controller 130 by sending a short status message that includes an identifier of the sensor and a brief coded summary of the status of the sensor. The sensor status may include, for example, a battery status. The sensor status may also include, for example, alert indications. Alert indications may signal, for example, a significant change in the quiescent recording conditions computed by the sensor. An alert indication may also signal, for example, a probability that a leak signal may have been detected in the recordings made by the sensor.

Referring to FIG. 1 and FIG. 2, using the local transceiver 260, the sensor 120 may advantageously send a status message every few seconds, or less frequently, in order to communicate with a mobile controller 130 at a short radio range. Such a controller may be carried by a user or may be present in a vehicle. Exchanging messages locally between a sensor 120 and a mobile controller 130 is useful because it allows a user present at or near the location of the sensor to obtain useful information from the sensor in near real-time. A user may use the controller to read status and other data from the sensor, for example, processed or unprocessed recorded data. Recorded data may include data recorded as part of a scheduled, synchronized recording by two or more sensors for the purpose of leak noise correlation or audio playback.

Referring again to FIGS. 1 and 2, using the network transceiver 260, the sensor 120 may advantageously send a status message every hour, or less frequently, in order to communicate with a controller 130 over a radio network, such as a cellular phone network. Exchanging messages remotely between sensors and a controller is useful because it allows a user at a remote location, such as a utility office, to obtain useful information from the sensor with a latency determined by the communicating protocol of the sensor. A user may use the controller to read recorded data, or other data, from the sensor, change one or more protocols in the sensor, and to instruct the sensor to perform a scheduled synchronized recording or other recording.

Referring again to FIG. 1, an analyzer 140 may include a tablet computer, such as an Apple iPad, executing an application such as the WaterPoint Network software application available from 64 seconds, Inc. The analyzer collects data, such as alert summaries, processed results, and vibration recordings, referred to collectively as sensor data, from the sensors 120, via a controller 130. The analyzer may present useful information derived from the sensor data to the user. For example, the analyzer may analyze the sensor data in order to compute a list of suspected leak locations. The analyzer may display the list of suspected leak locations in a table, from which the user may then select any particular suspected leak location to investigate further. Additionally, the analyzer may display a graphical trend over time of useful parameters from one or more sensors or the analyzer may convert the sampled data of a vibration recording to a sound recording so that the user may infer the likely source of the vibration energy, which might, for instance, be electrical interference, a meter rotating, water flowing, traffic, or the sound of a leak. In another example, the analyzer may display a parameter from the leak summaries, such as a quiescent sound level, geographically by superimposing a color representation of the parameter onto a map of the pipeline network.

In one implementation, two or more sensors 120 make synchronized recordings at a precise date and time and transmit the recordings to an analyzer 140, which may estimate the time delay $\Delta\tau$ between the occurrence of similar signals in the sensor recordings. The estimation of the time delay is the function of a leak noise correlator, such as the WaterPoint LNC system available from 64 seconds, Inc., and may be used to pinpoint a precise location of one or more leaks in the pipeline network. Specifically given the velocity of the traveling wave in a pipe section and the estimate of $\Delta\tau$, the distance d from the center of the pipe section to the leak is given by:

$$d = v \cdot \Delta\tau \tag{14}$$

Referring again to FIG. 2, obtaining an accurate representation of time that allows synchronization of the independent timekeepers 250 in two or more sensors 120 on two or more different occasions can be a challenging problem. A sensor 120 may receive an accurate timestamp value, via a transceiver 260, which is used to update the value of the timekeeper 250.

Referring to FIGS. 1 and 4, in one implementation, an analyzer 140 sends a synchronization message, which is intended for a particular sensor, to a controller 130. The synchronization message contains a digital representation of a synchronization time value, referred to as STC. The controller reads its timekeeper 430 to obtain a timestamp value, denoted by tc0. A timekeeper 430 may, for example, be an accurate 1 MHz clock, whose timestamp value may be a 32-bit number that corresponds to a number of ticks of the clock. Alternatively, a timekeeper may be a 32.768 kHz temperature-controlled crystal oscillator whose timestamp value may be a 32-bit number that corresponds to a number of ticks of the crystal oscillator. In any case, the timestamp value tc0 is expressed in units that allow for arithmetic operations involving TS and tc0.

At a later time, referred to as timestamp value tc1, the controller sends the synchronization message previously received from the analyzer at timestamp value tc0 to the particular sensor identified in the synchronization message.

In one implementation, the controller includes the value tc1 in the synchronization message. In another implementation, the controller includes the value of the quantity (tc1−tc0) in the synchronization message. In yet another implementation, the controller includes both the values tc0 and tc1 in the synchronization message.

Referring to FIGS. 2 and 4, the particular sensor 120, upon receiving the synchronization message, reads its timekeeper 250, to obtain a timestamp value, denoted by ts0 that corresponds to the time in the sensor when the synchronization message is received. At a later time, referred to as timestamp value ts1, the sensor updates the value of its timekeeper 250 so that the sensor timekeeper 250 is synchronized with the timekeeper 430 of the controller 130. The adjusted synchronization time, ASTS, written to the timekeeper of the sensor is given by:

$$ASTS = STC + (tc1 - tc0) + (ts1 - ts0) \tag{15}$$

In some implementations, the quantity (tc1−tc0) may be approximately zero or the quantity (ts1−ts0) may be approximately zero in which case the timekeeper of the particular sensor 120 is offset from STC accordingly. The accuracy of synchronization may be further improved by approximately time-aligning the reading of the timestamp values tc1 and ts0 by the controller and sensor, respectively. In some implementations, the wireless communication means in the controller and sensor may read the timestamp values tc1 and ts0, respectively, as part of the processes of transmission and reception, which yields an approximate known process-dependent lag between tc1 and ts0.

Referring again to FIGS. 2 and 4, the analyzer 140 subsequently sends a synchronization message, which is intended for a different sensor, to the same controller 130. The controller subsequently forwards the synchronization message to the different sensor, which subsequently updates the value of its timekeeper 250 so that its timekeeper is now also synchronized with the timekeeper 430 of the controller 130. Since the timekeepers of the two sensors are now each synchronized with the timekeeper 430 of the controller, the timekeepers of the two sensors are now therefore synchronized with each other.

The user initiates synchronization by sending a synchronization message from the analyzer to the controller at any particular time. Some indeterminate time later the controller is able to send that synchronization message to a sensor. Either at the same time or at a later time the controller will send the synchronization message to a second sensor. Both the controller and the sensors have similar high-precision timekeepers.

The new approach taken is to measure the delay in the controller between when it receives the message and the moment that it sends that message to a sensor. The sensor-specific delay information, for the controller, is sent to that sensor along with the synchronization message. The sensor is then able to program its timekeeper with the synchronization time provided by the controller, compensated for the time delay in the controller, and also compensated for any time delay between receiving and programming that occurs in the sensor.

Synchronizing sensors is useful because a correlation function in the time domain may be computed from two synchronized recordings. The correlation function can give precise information about the difference in time of arrival of a coherent leak sound at the two sensors. Combining the difference in time of arrival with knowledge of the sound velocity of the pipe, using equation 14, it is then possible to pinpoint the exact position in the pipe of the coherent leak sound.

Once two or more sensors have been synchronized, they may independently record, in a time-aligned manner, at a subsequent scheduled start time. The recording start times in each sensor may not be perfectly aligned because the timekeepers in each sensor may tick at slightly different rates, leading to a temporal drift in time so that the time in any sensor may progressively be retarded or advanced compared to the time in any other sensor. The temporal drift, or temporal misalignment between sensors, may be significant if the interval between the synchronization time and the recording start time is significant. If, for example, the timekeepers have a drift of up to plus or minus three parts per million, and the recording starts 12 hours after synchronization, then the temporal misalignment will be up to about 259 ms. If the sensors were connected to cast iron pipe, which may have a sound velocity of about 1,200 meters per second, then the resulting error in pinpointing the exact position of a coherent leaks sound in the pipe may be up to about 310 meters.

The error in pinpointing the exact position of a coherent leak sound in a pipe can be greatly reduced by performing at least two synchronizations: a first synchronization that occurs before the start of recording and a second synchronization that occurs subsequently.

Referring to FIG. 2, a synchronization may be invoked by a synchronization message received via a local transceiver 260 or a network transceiver 270. Alternatively, a synchronization may be invoked by a sensor itself, for example, by arranging for the sensor to receive a synchronization time from a GNSS receiver 275. In general, at the time of synchronization the sensor can compute the difference, ΔT, between the sensor time, ST, at the instant before synchronization and the adjusted synchronization time, ASTS, provided by the GNSS receiver:

$$\Delta T = ASTS - ST \quad (16)$$

ΔT is the temporal drift of the sensor over time, that is, ΔT is the difference between the expected and actual sensor time at the instant of the synchronization.

The sensor can be designed so as to make the temporal drift of its timekeeper approximately linear. A temperature-controlled crystal oscillator is a well-known method of linearizing temporal drift with changes in temperature. Other sources of temporal drift, such as crystal aging, are often naturally approximately linear. If the temporal drift can reasonably be assumed to be linear, and if the recording start time is known relative to the synchronization times, then the temporal drift from the first synchronization to the recording start time may be estimated.

Referring to FIG. 10, an illustrative graphic 1000 of a timeline including two synchronizations and a recording shows two sensors, S1 1005 and S2 1010, that may be synchronized at a first synchronization time $t_{SYNC1}$ 1015. The sensors have a recording scheduled for a time $t_{REC}$ 1020 that is either coincident with or later than the synchronization time $t_{SYNC1}$ 1015. In actuality, sensor S1 starts recording not at time $t_{REC}$, but at time $t_{S1-REC}$ 1025 and sensor S2 starts recording at a different time, $t_{S2-REC}$ 1030. The differences in actual recording times of the two sensors are due to the temporal drift of the timekeepers of the sensors. The sensors may be synchronized again at a second synchronization time $t_{SYNC2}$ 1035. In actuality, the value of the timekeepers of sensors S1 and S2 at the actual time $t_{SYNC2}$ is $t_{S1-SYNC2}$ 1040 and $t_{S2-SYNC2}$ 1045, respectively. The temporal drifts of the sensors S1 1005 and S2 1010 at the time of the second synchronization, $t_{SYNC2}$, may be computed using equation 16 and are referred to as ΔT1 and ΔT2, respectively:

$$\Delta T1 = t_{SYNC2} - t_{S1-SYNC2}$$

$$\Delta T2 = t_{SYNC2} - t_{S2-SYNC2} \quad (17)$$

We may further define two time intervals, TA and TB, such that:

$$TA = t_{REC} - t_{SYNC1}$$

$$TB = |t_{SYNC2} - t_{REC}| \quad (18)$$

where || means the absolute value.

Referring again to FIG. 10, which depicts $t_{SYNC2}$ occurring after $t_{REC}$, the ratio r of the interval between the first synchronization time and the recording time (TA) and the interval between the recording time and the second synchronization time (TB) is:

$$r = \frac{TA}{TA + TB} \text{ for } t_{SYNC2} \geq t_{REC} \quad (19)$$

$$r = \frac{TA}{TB} \text{ for } t_{SYNC2} \leq t_{REC}$$

If the recording start time occurs, for example, exactly at the midpoint in time between the first and second synchronizations then, by interpolation, the value of r is 0.5. If the second synchronization time occurs, for example, exactly at the midpoint in time between the first synchronization time and the recording time then, by extrapolation, the value of r is 2.0. At the recording start time, the temporal drifts of the timekeepers of sensors S1 and S2 are given by:

$$\tau_{S1-REC} = r \cdot (t_{SYNC2} - t_{S1-SYNC2})$$

$$\tau_{S2-REC} = r \cdot (t_{SYNC2} - t_{S2-SYNC2}) \quad (20)$$

The relative temporal drift between sensor S1 1005 and sensor S2 1010 is therefore:

$$\tau_{REC} = \tau_{S1-REC} - \tau_{S2-REC} \quad (21)$$

In order to compute a leak noise correction between the synchronized, time-aligned recordings made by the sensors S1 and S2, the well-known equation to compute the cross-correlation function may be expressed as:

$$Q(\tau) = \sum_{n=0}^{N-1} x(n + \tau_{REC}) \cdot y(n + \tau) \; N < (n + \tau_{REC}) \geq 0 \quad (22)$$

where Q(T) is the cross-correlation function at lag T, x(n) is the recording from sensor S1, y(n) is the recording from sensor S2, and N is the number of samples recorded by each sensor.

A number of implementations have been described. Nevertheless, it will be understood that various modifications may be made. Accordingly, other implementations are within the scope of the following claims.

What is claimed is:

1. A system for sensing vibrations on a pipeline network, the system comprising:
   one or more vibration sensors, wherein each vibration sensor comprises:
   a transducer that converts a vibration signal to an analog electrical signal,
   a digitizer that converts the analog electrical signal to a sequence of numerical values,
   a first timekeeper,
   a processor that processes the sequence of numerical values, and
   a first wireless communication module;

a controller configured to exchange data with the sensors, wherein the controller comprises:
a second wireless communication module, and
a second timekeeper; and
an analyzer that comprises an interface to the controller,
wherein the first wireless communication module of a first sensor comprises a GNSS receiver able to output a synchronization time that is used by the processor of the first sensor to write a time value to the first timekeeper of the first sensor,
wherein the processor of the first sensor writes a first synchronization time value received from a GNSS receiver to the first timekeeper of the first sensor and, at a later time, receives a second synchronization time from the GNSS receiver and measures a difference between the second synchronization time value and the simultaneously existing value of the first timekeeper of the first sensor in order to compute a time drift of the first timekeeper of the first sensor in the span of the synchronization times, and
wherein a sequence of recorded numerical values is shifted in time by an amount corresponding to the computed time drift or a rate of time drift of the first timekeeper of the first sensor.

2. The system of claim 1, wherein the transducer is a pressure transducer that produces the analog electrical signal to represent pressure.

3. The system of claim 1, wherein the transducer has a light source and an optical sensor for measuring the changes in displacement of a vibrating surface.

4. The system of claim 3, wherein the transducer is attached to the vibrating surface via a damped mounting such that the optical sensor may sense relative changes in displacement between the optical sensor and the vibrating surface.

5. The system of claim 3, wherein the transducer is not attached to the vibrating surface such that the optical sensor may sense relative changes in displacement between the optical sensor and the vibrating surface.

6. The system of claim 1, wherein the sensors are located based on information about the pipeline network, and designated available sensor locations, which are used to evaluate sound paths from points in the pipeline network to sensor locations.

7. The system of claim 6, wherein sensors are assigned to a selected subset of sensor locations.

8. The system of claim 7, wherein the sensor locations of the selected subset are selected to maximize the total lengths of sound paths within acoustic range of the subset of sensor locations.

9. The system of claim 7, wherein the sensor locations of the selected subset are selected to maximize an expected value benefit accruing from the subsequent detection of leaks by the sensors.

10. The system of claim 1, wherein the software of the processor of the sensor contains one or more protocols that have been received from the controller.

11. The system of claim 10, wherein the received protocols include protocols for recording, processing, or communicating.

12. The system of claim 1, wherein a series of vibration recordings made at one or more sensors are processed as an ensemble.

13. The system of claim 12, wherein the processing includes the estimation of a quiescent vibration pattern.

14. A system for sensing vibrations on a pipeline network, the system comprising:
one or more vibration sensors, wherein each vibration sensor comprises:
a pressure transducer that produces an analog electrical signal to represent pressure,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein the processor of a first sensor is configured to process the sequence of numerical values to identify a time-varying component of pressure in fluid in the pipeline network and a time-invariant component of pressure in fluid in the pipeline network.

15. The system of claim 14, wherein the pressure transducer is a hydrophone incorporated in a hydrant of the pipeline network.

16. The system of claim 14, wherein the controller is configured to send timestamp-related values to the one or more vibration sensors using the second wireless communication module and a vibration sensor of the one or more vibration sensors is configured to receive the timestamp-related values and set a value of the first timekeeper using the received timestamp-related values.

17. The system of claim 16, wherein the vibration sensor is configured to read and adjust values of the first timekeeper and to set the value of the first timekeeper using the received timestamp-related values and an adjusted value of the first timekeeper.

18. The system of claim 14, wherein the first wireless communication module of a sensor causes the reading of one or more values from the first timekeeper of the sensor when receiving and the second wireless communication module of the controller causes the reading of one or more values from the second timekeeper when transmitting.

19. A system for sensing vibrations on a pipeline network, the system comprising:
one or more vibration sensors, wherein each vibration sensor comprises:
a transducer that converts a vibration signal to an analog electrical signal,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein the sensors are located based on information about the pipeline network, and designated available sensor locations, which are used to evaluate sound paths from points in the pipeline network to sensor locations,
wherein sensors are assigned to a selected subset of sensor locations,
wherein the sensor locations of the selected subset are selected to maximize an expected value benefit accruing from the subsequent detection of leaks by the sensors, and wherein the expected value benefit is the expected value of water that would be recovered from the detection of leaks by the sensors that would otherwise have been lost.

20. A system for sensing vibrations on a pipeline network, the system comprising:
one or more vibration sensors, wherein each vibration sensor comprises:
a transducer that converts a vibration signal to an analog electrical signal,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein the sensors are located based on information about the pipeline network, and designated available sensor locations, which are used to evaluate sound paths from points in the pipeline network to sensor locations,
wherein sensors are assigned to a selected subset of sensor locations,
wherein the sensor locations of the selected subset are selected to maximize an expected value benefit accruing from the subsequent detection of leaks by the sensors, and
wherein the designated sensor locations may be modified based on modifications in the evaluated sound paths that can result from changes in information about the pipeline network provided by actual leaks.

21. A system for sensing vibrations on a pipeline network, the system comprising:
one or more vibration sensors, wherein each vibration sensor comprises:
a transducer that converts a vibration signal to an analog electrical signal,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein the software of the processor of a first sensor contains one or more protocols that have been received from the controller, and
wherein the one or more protocols that have been received were sent by the analyzer in response to setting a location of the first sensor.

22. A system for sensing vibrations on a pipeline network, the system comprising:
one or more vibration sensors, wherein each vibration sensor comprises:
a transducer that converts a vibration signal to an analog electrical signal,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein the software of the processor of a first sensor contains one or more protocols that have been received from the controller, and
wherein the one or more protocols that have been received were sent by the analyzer in response to evaluated sound paths in the pipeline network.

23. A system for sensing vibrations on a pipeline network, the system comprising:
one or more vibration sensors, wherein each vibration sensor comprises:
a transducer that converts a vibration signal to an analog electrical signal,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein a series of vibration recordings made at one or more sensors are processed as an ensemble,
wherein the processing includes the estimation of a quiescent vibration pattern, and
wherein the processing includes the estimation of a measure of self-similarity to enhance the estimate of a quiescent vibration pattern.

24. A system for sensing vibrations on a pipeline network, the system comprising:
one or more vibration sensors, wherein each vibration sensor comprises:
a transducer that converts a vibration signal to an analog electrical signal,
a digitizer that converts the analog electrical signal to a sequence of numerical values,
a first timekeeper,
a processor that processes the sequence of numerical values, and
a first wireless communication module;
a controller configured to exchange data with the sensors; and
an analyzer that comprises an interface to the controller,
wherein a series of vibration recordings made at one or more sensors are processed as an ensemble,
wherein the processing includes the estimation of a quiescent vibration pattern, and
wherein the processing includes applying an estimator having characteristics that have been obtained from the analyzer, to enhance the estimate of a quiescent vibration pattern.

* * * * *